(12) United States Patent
Hersch et al.

(10) Patent No.: US 7,491,424 B2
(45) Date of Patent: Feb. 17, 2009

(54) REPRODUCTION OF SECURITY DOCUMENTS AND COLOR IMAGES WITH METALLIC INKS

(75) Inventors: Roger David Hersch, Epalinges (CH); Patrick Emmel, Pratteln (CH); Fabien Collaud, Nyon (CH)

(73) Assignee: Ecole Polytechnique Fédérale De Lausanne (EPFL), Lausanne (CH)

( * ) Notice: Subject to any disclaimer, the term of this patent is extended or adjusted under 35 U.S.C. 154(b) by 999 days.

(21) Appl. No.: 10/440,355

(22) Filed: May 19, 2003

(65) Prior Publication Data

US 2004/0233463 A1    Nov. 25, 2004

(51) Int. Cl.
  B05D 1/36    (2006.01)
  B32B 3/00    (2006.01)
  B41M 5/025   (2006.01)
  G03F 3/08    (2006.01)
  H04N 1/46    (2006.01)
  H04N 1/405   (2006.01)

(52) U.S. Cl. .................. 427/267; 358/3.13; 358/3.16; 358/504; 358/518; 358/523; 428/204; 428/207; 428/208

(58) Field of Classification Search .................. None
See application file for complete search history.

(56) References Cited

U.S. PATENT DOCUMENTS

| | | | |
|---|---|---|---|
| 4,420,515 A | 12/1983 | Amon | 428/29 |
| 5,032,003 A | 7/1991 | Antes | 359/567 |
| 5,370,976 A | 12/1994 | Williamson et al. | 430/358 |
| 6,198,545 B1 | 3/2001 | Ostromoukhov | 358/3.09 |
| 6,208,735 B1 | 3/2001 | Cox | 380/54 |

OTHER PUBLICATIONS

U.S. Appl. No. 09/923,762, filed Jun. 27, 2002, N. Lofgren.
F. R. Clapper and J. A. C. Yule,The Effect of Multiple Internal Reflections on the Densities of Half-tone Prints on Paper, Journal of the Optical Society of America, vol. 43, No. 7, Jul. 1953, pp. 600-603.
S. Inoue, N. Tsumara, Y. Miyake, Measuring MTF of Paper by Sinusoidal Test Pattern Projection, Journal of Imaging Science and Technology, vol. 41, No. 6, Nov./Dec. 1997, 657-661.
D.B. Judd, Fresnel reflection of diffusely incident light, Journal of Research of the National Bureau of Standards, vol. 29, Nov. 1942, 329-332.

(Continued)

*Primary Examiner*—Bruce H Hess

(57) ABSTRACT

The present invention discloses methods and systems for printing by superposing a metallic ink and transparent inks. These methods and systems are useful for color separating images into superpositions of a metallic ink and transparent inks both for design purposes and for the creation and authentication of security documents, such as banknotes, checks, diploma, corporate documents, passports, identity cards, credit cards, product labels, optical disks, CDs, DVDs, packages of medical drugs, cosmetics, and alcoholic drink bottles. By combining a metallic ink and transparent inks, one may create printed images behaving dynamically: an image viewed under specular reflection may be considerably different from the same image viewed under non-specular reflection. Patterns which are either dark or hidden become highlighted under specular reflection, yielding interesting visual effects. Metallic inks allow therefore to create visually appealing dynamically changing color images. In addition, the inversion effect provided by metallic inks allows to enhance microstructures present in the image or to reveal hidden patterns. Since these effects are lost in photocopied documents, the disclosed methods, systems and security documents offer a high security against counterfeiting attempts.

4 Claims, 17 Drawing Sheets

OTHER PUBLICATIONS

H.R. Kang, Applications of color mixing models to electronic printing, Journal of Electronic Imaging, vol. 3, No. 3, Jul. 1994, 276-287.

H.R. Kang, "Color Technology for Electronic Imaging Devices", SPIE Optical Engineering Press, 1997, pp. 8-12.

H.R. Kang, "Color Technology for Electronic Imaging Devices", SPIE Optical Engineering Press, 1997, pp. 43-45, original reference is : J.A.C. Yule, W.J. Nielsen, The penetration of light into paper and its effect on halftone reproductions, Proc. TAGA, vol. 3, 1951, 65-76.

Kern G.M., Micale J., Lavelle S., Valenzuela P., "Hiding power of aluminium pigments in printed ink films", American Ink Maker, vol. 69, No. 10, Oct. 1991, 60-68.

H. Kipphan, Handbook of Print Media, Springer-Verlag, 2001, pp. 103-105.

H. Kipphan, Handbook of Print Media, Springer-Verlag, 2001, p. 92.

H. Kipphan, Handbook of Print Media, Springer-Verlag, 2001, p. 87, p. 501.

P. Kubelka, "New contributions to the optics of intensely light-scattering material, part II: Non-homogeneous layers", Journal of the Optical Society of America, vol. 44, 1954, 330-335.

H.E.J. Neugebauer, Die theoretischen Grundlagen des Mehrfarbendrucks, Zeitschrift fuer wissenschaftliche Photographie, vol. 36, 1937, 36-73, reprinted in Neugebauer Seminar on Color Reproduction, SPIE vol. 1184, 1989, 194-202.

V. Ostromoukhov, R.D.Hersch, "Artistic Screening", Siggraph95, Computer Graphics Proceedings, Annual Conference Series, 1995, pp. 219-228.

W.H. Press, B.P. Flannery, S.A. Teukolsky, W.T. Fetterling, Numerical Recipes, Cambridge University Press, 1st edition, 1988, section 10.5, pp. 309-317.

G. Rogers, "A Generalized Clapper-Yule Model of Halftone Reflectance", Journal of Color Research and Application, vol. 25, No. 6, Dec. 2000, 402-407.

J.L. Saunderson, "Calculation of the color pigmented plastics, Journal of the Optical Society of America", vol. 32, 1942, 727-736.

A. Stanton, G. Raencic, Ink Trapping and Colorimetric Variation, Proc. TAGA 2001, 258-281.

E.J. Stollnitz, V. Ostromoukhov, D.Salesin, "Reproducing Color Images Using Custom Inks", Proc. of SIGGRAPH 98, in Computer Graphics Proceedings, Annual Conference Series, 1998, 267-274.

D.R. Wyble, R.S. Berns, A Critical Review of Spectral Models Applied to Binary Color Printing, Journal of Color Research and Application, vol. 25, No. 1, Feb. 2000, 4-19.

REPRODUCTION OF SECURITY DOCUMENTS AND COLOR IMAGES WITH METALLIC INKS

BACKGROUND OF THE INVENTION

The present invention relates generally to the field of security documents and more particularly to the printing of images and security documents incorporating at least one metallic ink. By combining a metallic ink and transparent inks, one may create printed images behaving dynamically: an image viewed under specular reflection may be considerably different from the same image viewed under non-specular reflection. Patterns which are either dark or hidden become highlighted under specular reflection, yielding interesting visual effects. Metallic inks allow therefore to create visually appealing dynamically changing color images. In addition, the inversion effect provided by metallic inks allows to enhance microstructures present in the image or to reveal hidden patterns. This is especially useful for the creation of security documents. This is of high importance, since counterfeiting of documents such as banknotes is becoming now more than ever a serious problem, due to the availability of high-quality and low-priced color photocopiers and desk-top publishing systems. The same is also true for other valuable products such as CDs, DVDs, software packages, medical drugs, luxury goods, etc., that are often marketed in easy to falsify packages. The present invention aims at providing a novel security element and authentication means offering enhanced security for banknotes, checks, credit cards, identity cards, travel documents, industrial packages or any other valuable articles, thus making them much more difficult to counterfeit. In addition the present invention discloses methods for separating an input color image into a metallic ink and transparent inks. This may be used also to create color images having a metallic appearance at specular reflection angles and therefore enlarge the design space of artists. For design purposes and for increasing the security of documents and valuable goods against counterfeiting, we also disclose a method for integrating metallic elements into regions of an image. Thanks to the integrated metallic elements, the visibility of microstructure patterns embedded into a color image can be enhanced at specular angles. Moreover, support can be offered for designs and security documents making use of the inversion effect, i.e. transitions between darkness at non-specular reflection angles and highlights at specular reflection angles. Furthermore, ghost patterns may be hidden at non-specular angles and become apparent at specular angles.

A prior art method called "Metallic Color Printing Process" is disclosed in U.S. Pat. No. 5,370,976 and describes a color separation method for printing images incorporating metallic inks such as gold or silver in addition to standard cyan, magenta, yellow, and black inks. This as well as other prior art approaches for printing with metallic inks (see section background in U.S. Pat. No. 5,370,976) rely on a simple undercolour removal technique. A metallic ink has, under non-specular viewing conditions, an assigned c'm'y' (cyan, magenta, yellow) equivalent, which is subtracted from the original cmy (cyan, magenta, yellow) values in order to yield the amounts of $c_s m_s y_s$ to be printed on top of the metallic ink. However, since the combination of ink layers is not really subtractive, this method cannot ensure a high reproduction fidelity. Furthermore, that prior art method is not able to predict the colorimetric values (e.g. the CIE-XYZ tri-stimulus values) neither of the patch with the original ink coverage cmy (cyan, magenta, blue) values, nor of patch with the coverage values $c_s m_s y_s$ of the inks to be printed by superposing transparent inks and the metallic ink.

To ensure a high reproduction fidelity, one needs to rely on a scientific model predicting the spectra (or the calorimetric values) of printed ink patches. Establishing a spectral prediction model which is valid for printing both with transparent inks and with a combination of a metallic ink and transparent inks represents a considerable challenge. Such a prediction model is disclosed in detail in the present invention and used for predicting the reflection spectrum (and therefore also the colorimetric values) of patches printed either with or without a metallic ink layer.

In respect to security documents, non-standard inks such as metallic or iridescent inks are already used for protecting security documents and valuable articles such as banknotes, tickets, etc. See for example the Swiss banknotes. Metallic inks however are generally printed either alone or on top of an existing image. Since they are not really embedded into an image, they can be reproduced without much effort. The present invention discloses how to embed metallic ink patterns into printed color images.

One prior art method for the creation of patterns visible at specular reflection angles consists in overlaying on top of an image a transparent varnish. Since the varnish is transparent at non-specular reflection angles and reflects light at specular reflection angles, patterns become visible at specular reflection angles. However, the reflected light has the same color as the incident light, i.e. in the general case white. In contrast to a varnish, the superposition of a metallic ink and transparent inks yields a colored reflected light, whose color depends on the color and the amounts of transparent inks superposed on top of the metallic ink.

Patent application GB2375322, Security Device, inventors J. L. Thick, A. Nutton and R. Bratchley (also published as PTO WO0166360 and AU376320, priority date 10 Apr. 2000) teaches a method for securing documents by printing an opaque, white or lightly colored diffusely reflective ink on top of a specular reflective background, e.g. a solid metallic ink. By tilting the document, the specular reflective background is either dark or highlight, making the diffusely reflective ink appear by contrast as respectively either highlight (white) or dark. In contrast to that method, the present invention discloses how to synthesize and print a full color image comprising a metallic ink and several standard inks, said standard inks being transparent, i.e. not diffusely reflecting or diffusely reflecting to a negligible extent.

SUMMARY

Due to the wide availability of color photocopiers and scanners, the risk of counterfeiting security documents has largely increased. The present invention discloses methods allowing to print color images and security documents incorporating metallic inks in order to create special effects which are lost by photocopying or scanning. The disclosed methods, apparatuses and systems are therefore applicable for creating and authenticating security documents (such as banknotes, checks, trust papers, securities, identification cards, passports, travel documents, tickets, etc.) and valuable articles (such as optical disks, CDs, DVDs, software packages, medical products, etc.) which need advanced authentication means in order to prevent counterfeiting attempts.

The disclosed methods allow to predict the color and spectra of patches printed with transparent inks as well as the color and spectra of patches printed by superposing a metallic ink and transparent inks. Fitting procedures relying on these methods allow to compute the coverages of a superposition of a metallic ink and transparent inks so as to match the color of a patch printed with given coverages of transparent inks. This yields to an accurate technique for the replacement of colors printed by transparent inks by colors printed with a combination of a metallic ink and transparent inks. A mask may define the locations within the color image, which are to be reproduced by the superposition of a metallic ink and transparent inks. When viewed at a non-specular reflection angle, the region defined by the mask may not be easily distinguished from the surrounding area, i.e. it may be partly or completely hidden within the reproduced image. Such a region may therefore have a low visibility. However, when viewed at a specular angle, due to the specular reflection properties of the metallic ink, that region becomes highly visible. It may mask other elements or motives which are printed by transparent inks only. These effects can be exploited to create security documents incorporating clearly visible anti-counterfeiting features, for example:

patterns which are hidden at non-specular reflection angles appear strongly at specular reflection angles,
  patterns which appear dark at non-specular reflection angles become highlighted at specular angles (inversion effect),
  motives which are visible at non-specular reflection angles are masked at specular reflection angles,
  microstructures which have a normal appearance at non-specular reflection angles become strongly enhanced at specular reflection angles and
  colored patterns which have a low visibility or are hidden at non-specular reflection angles become strongly apparent at specular reflection angles.

All these effects are lost in photocopied documents since these documents do not include the metallic ink responsible for the specular reflection. Furthermore, even printing professionals cannot easily reproduce color images with metallic inks, since they don't have access to the software or system being able to match the color of transparent inks by the superposition of a metallic ink and transparent inks.

Being able to accurately replace amounts of transparent inks by the superposition of an amount of a metallic ink and corrected amounts of transparent inks so as to match the respective colors produced by the transparent inks allows to create a system for performing the color separation of an image to be printed with the superposition of a metallic ink and transparent inks such as the standard cyan, magenta, yellow inks. Such a system may first perform the standard color separation from original image colors (e.g. red, green, blue) to amounts of transparent inks, e.g. cyan, magenta and yellow, and then from the amounts of transparent inks to corresponding amounts of the superposition of a metallic ink and transparent inks, e.g. silver, cyan, magenta and yellow. As an alternative, a color separation system for printing with at least one metallic ink may also first convert original image colors to an independent colorimetric space such as the CIE-XYZ space and then fit the amounts of a metallic ink and of transparent inks so as to meet the desired CIE-XYZ colorimetric values.

A color image may also be printed with several metallic inks printed in combination with transparent inks, where metallic inks are printed without overlapping. For example each ink may be printed in a different region of the image. The metallic ink may be selected according to the predominant image color or according to a predefined colored metallic pattern becoming visible at specular reflection angles. The parameters of the models enabling the color separation into the superposition of a metallic ink and transparent inks will be specific for each metallic ink.

Thanks to the disclosed model for predicting the color (and the reflection spectra) of the superposition of a metallic ink and transparent inks, color images may be produced which comprise superpositions of a metallic ink and transparent inks, where the coverages of the transparent inks located on top of the metallic ink are obtained by matching the color of original transparent ink coverages without metallic ink with computed coverages of the metallic ink and transparent inks. Alternately, color images given in device-independent coordinates such as CIE-XYZ may be reproduced by superposing amounts of a metallic ink and transparent inks computed according to the model. Such color images are also the object of the present invention.

The present invention also discloses a system operable for performing the color separation of an input color image into a color separated output image printable with a set of inks comprising at least one metallic ink. The system comprises a module for performing the color separation of the input color image into transparent inks, a module for predicting the color of the superposition of a metallic ink and transparent inks, optionally a module for performing the calibration of the model capable of predicting the color of the superposition of a metallic ink and transparent inks and a module for fitting coverages of a metallic ink and transparent inks so as to match the color printed by transparent inks without the metallic ink.

For efficiency and speed, the present invention also discloses a lookup table based system operable for performing the color separation of an input color image into an output image printable with a set of inks comprising at least one metallic ink. The system comprises a module for predicting the color of the superposition of a metallic ink and transparent inks and a lookup table whose values are computed by the module predicting the color of the superposition of a metallic ink and transparent inks. The lookup table gives the coverages of the superposition of a metallic ink and transparent inks. Indices to the lookup table may be red, green, and blue color coordinates, CIE-XYZ device independent color coordinates or coverages of cyan, magenta, yellow inks to be matched by the coverages of the superposition of a metallic ink and transparent inks.

One may choose, instead of producing the metallic ink layer by printing with a metallic ink, to synthesize the metallic layer by another process such as the transfer of a metallic foil on a diffusely reflective substrate.

One may choose, instead of producing the metallic ink layer by printing with a metallic ink, to produce a specular reflective layer (e.g. a metallic layer) by laying out a specular reflective substrate on top of a diffusely reflective substrate. This specular reflective layer may comprise tiny holes or other elements allowing a small part of the light to pass through in order to behave like a metallic ink layer, i.e. to transmit a part of the incident light to the underlying diffusely reflective substrate. The diffusely reflective substrate may be embodied by a diffusely reflecting sheet of plastic, e.g. a plastic sheet forming the substrate of an identity card.

The invention further discloses a metallic ink optimized for printing with superposed transparent inks comprising metallic particles and a binder, where the metallic particles are flat and float on top of the binder, and where the space between the metallic particles allows light to pass through and be reflected by an underlying diffusely reflecting layer. The superposition of the metallic ink and transparent inks yields under specular reflection colors which depend on the relative amounts of the transparent inks. The metallic ink may be further optimized to provide a high adherence to transparent inks printed on top of it. This allows to enlarge the color gamut that can be reproduced by the superposition of a metallic ink and transparent inks.

The invention also discloses an apparatus operable for verifying the presence and obtaining the information item associated to a pattern embedded into a security document printed by superposing a metallic ink and transparent inks comprising a light source, an image acquisition device and computing means for recognizing the presence of a specular reflecting pattern within the acquired image and for identifying the pattern and associating it to an information item. The information item may then be used for authenticating the security document. In addition, the information item associated to a pattern embedded into a security document printed by superposing a metallic ink and transparent inks may be individualized, i.e. specific to each instance of the security document. Such an information item may for example be related to the document identification number, the temporal validity range or the name of the holder of the document.

DETAILED DESCRIPTION OF THE INVENTION

Figure 1:
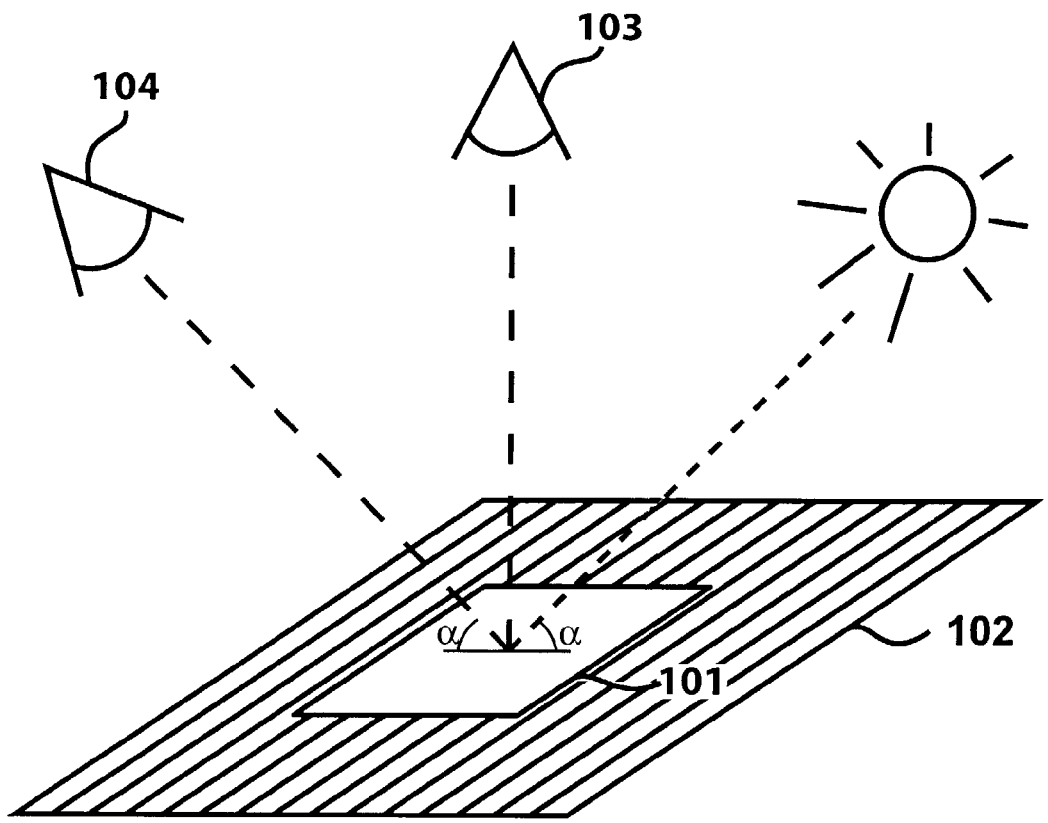
FIG. 1 shows a specular 104 and a non-specular viewing angle 103.

The present invention discloses methods for carrying out the color separation of an input image with the goal of printing with metallic inks. Furthermore, it discloses methods for embedding metallic patterns into color images which may be parts of security documents such as banknotes, checks, identity documents, packages of valuable goods, etc. These metallic patterns may be slightly visible (low visibility) or completely invisible at non-specular reflection angles (e.g. the geometrical configuration 103 in FIG. 1) and strongly visible (high visibility) at specular reflection angles (e.g. the geometrical configuration 104 in FIG. 1). Therefore, the metallic ink can be used to hide information in the image when viewed at a non-specular viewing angle. Hereinafter, we use the terms "non-specular observation angles", "non-specular viewing angles", "non-specular reflection angles" or simply "non-specular angles" interchangeably. These terms mean that the light reflected by the image towards the observer's eyes is mainly diffuse. The terms "specular observation angles", "specular viewing angles", "specular reflection angles" or simply "specular angles" are also used interchangeably. They mean that the light reflected by the image towards the observer's eyes is mainly specular.

It should be noted that the term "security documents" or simply "documents" refers throughout the present disclosure to all possible valuable articles, including (but not limited to) banknotes, checks, diploma, corporate documents, passports, identity cards, credit cards, product labels, optical disks, CDs, DVDs, packages of medical drugs, cosmetics, wine bottles, alcoholic drinks or of any other commercial products, etc.

Within a security document or within a target image (e.g. 102 in FIG. 1), at least part of the document, respectively of the image (e.g. 101 in FIG. 1), is rendered with a superposition of transparent inks and of at least one metallic ink. Since we would like to superpose (print) inks on top of a metallic ink, the considered inks need to be transparent inks, for example cyan, magenta and yellow. However other transparent inks such as orange, red, green and blue inks may also be used. The term "standard inks" simply indicates that the considered inks are not special inks such as metallic inks. They may however be of any color. For the sake of simplicity, the techniques described below are explained considering the widely used transparent cyan, magenta and yellow inks. However, these techniques also apply in a straightforward manner to transparent inks of any color. Transparent inks are inks which absorb one part of the light and transmit a second part of the light into the next layer (e.g. the substrate). They don't scatter much light back. The terms "standard inks" and "transparent inks" are therefore used interchangeably.

It should be noted that the term "ink" is used in a generic sense: it may comprise any matter such as offset inks, ink-jet inks, dye sublimation colorants, etc. that can be transferred onto specific locations of a substrate. The terms "print" and "printing" in the present disclosure refer to any process for transferring an image onto a support, including by means of a lithographic, photographic, electrophotographic, ink-jet, dye-sublimation, engraving, etching, perforating, embossing or any other process. The support may be any diffusely reflecting substrate such as paper, polymer, plastic, etc. . .

The terms "amount of ink" and "coverage of ink" are used interchangeably. Generally, an initial amount of ink is specified. The halftoning (also called screening) software converts amounts of an ink into screen elements with surface coverages equal to the desired amounts of ink. Once printed, due to physical dot gain, these surface coverages generally slightly increase. Therefore "nominal coverages" are initially specified amounts of the inks and "fitted coverages" are the effective coverages computed from the spectral measurements of the printed patches according to the underlying model (enhanced Clapper-Yule model), as described in detail below.

The present invention also discloses systems for performing the color separation of images into images to be printed with at least one metallic ink and transparent inks. Such systems are generally embodied by computing systems comprising at least a processor and memory. Input and output data are received by and transmitted from the computing system either through a network or through a removable medium such as a removable hard disk, a CD-ROM, a DVD, a ZIP or a removable memory stick.

The prediction models disclosed below allow to predict the reflection spectra of printed color patches, without or with a metallic ink. Once the reflection spectra are known, it is easy to obtain the colorimetric tri-stimulus values of the corresponding patch in the CIE-XYZ system. Formula for computing CIE-XYZ tri-stimulus values from reflection spectra are given in the book by H. R. Kang, Color Technology for Electronic Imaging Devices, SPIE Optical Engineering Press, 1997, pp. 8-12. Therefore, the disclosed prediction models also allow to predict the colorimetric values of printed patches.

One aim of the present invention is to enhance at specular reflection angles the visibility of microstructure patterns embedded into a color image. A second aim of this invention if to offer support for designs making use of the inversion effect, i.e. transitions between darkness at non-specular reflection angles and highlights at specular reflection angles. Yet a further aim of the invention is to allow to hide a ghost pattern at non-specular angles and make it apparent at specular angles. A last aim of the present invention is to provide a method for accurate color separation when printing with metallic inks.

These goals can be reached if we can replace for example the coverages of standard cyan (c), magenta (m) and yellow (y) inks used in offset printing by an appropriate coverage of preferably an achromatic metallic ink, called silver (s), and adapted coverages of standard cyan ($c_s$), magenta ($m_s$) and yellow ($y_s$) inks. Under non-specular light reflection, a printed cmy patch should not be distinguishable from its corresponding printed $sc_s m_s y_s$ patch.

In order to be able to find for given coverages cmy of standard inks the corresponding coverages $sc_s m_s y_s$ of the superposition of silver and standard inks, we need accurate color printing prediction models, both for standard inks and for the combination of a metallic ink (such as silver) and standard inks.

Many different phenomena influence the reflection spectrum of a color patch printed on a given diffusely reflecting substrate (e.g. a coated paper) or on top of a metallic ink. We need to take into account the surface (Fresnel) reflection at the interface between the air and the substrate, the light diffusion and reflection within the substrate (e.g. paper bulk), the internal (Fresnel) reflections at the interface between the substrate and the air and in the case of a metallic ink, reflection and absorption of light by the metallic ink layer. The establishment of accurate and experimentally verified prediction models remains an active topic of research (see D. R. Wyble, R. S. Berns, A Critical Review of Spectral Models Applied to Binary Color Printing, Journal of Color Research and Application, Vol. 25, No. 1, February 2000, 4-19).

Furthermore, one needs to take into account phenomena which are specific to metallic ink printing such as the interaction of light and the metallic ink, the strongly reduced amount of a transparent ink that can be deposited over a metallic ink (trapping effect) and the fact that a transparent ink printed over a metallic ink raises the metallic ink's reflection spectrum at non-specular reflection angles. For all these reasons, simple approaches based on undercolour removal such as the approaches described in U.S. Pat. No. 5,370,976 cannot be sufficiently accurate for our needs.

We address these problems by generalizing in an original way the well-known Clapper-Yule model (see "The Effect of Multiple Internal Reflections on the Densities of Half-tone Prints on Paper", F. R. Clapper and J. A. C. Yule, Journal of the Optical Society of America, Volume 43, Number 7, July 1953, pp. 600-603) and taking specifically into account phenomena such as ink spreading when printing one ink over a second ink, trapping of a transparent ink printed over a metallic ink, and the raised metallic ink reflection spectrum phenomenon.

With the establishment of a prediction model capable of predicting the spectrum of transparent inks and of the combination of a metallic ink and transparent inks, we can construct a 3D lookup table for establishing the correspondence between given coverages of transparent inks (e.g. cyan, magenta, and yellow) and corresponding coverages of the metallic ink and transparent inks (e.g. silver, and cyan, magenta and yellow). Such a 3D lookup table allows then by tri-linear interpolation to replace very quickly transparent inks by a combination of the metallic and transparent inks.

In early printing prediction models, the term "dot gain" encompasses both the physical dot gain (the enlargement of the printed dot) and the optical dot gain due to the lateral propagation of light (scattering within the paper bulk and internal reflections at the interface between paper and air). The Neugebauer model predicts the CIE-XYZ color coordinates (also called tri-stimulus values) of a color halftone patch as the sum of the color coordinates of their individual colorants weighted by their fractional area coverages $a_i$ (see H. E. J. Neugebauer, Die theoretischen Grundlagen des Mehrfarbendrucks, Zeitschrift fuer wissenschaftliche Photographie, Vol. 36, 1937, 36-73, reprinted in Neugebauer Seminar on Color Reproduction, SPIE Vol-1184, 1989, 194-202). By replacing the color coordinates of colorants by their respective reflection spectra $R_i$, one obtains the spectral Neugebauer equations giving the predicted reflection spectra $R(\lambda)$ of printed color patches $$R(\lambda) = \sum_i a_i \cdot R_i(\lambda) \qquad (1)$$

In the case of independently printed cyan, magenta and yellow inks of respective coverages c, m, y, the fractional area coverages of the individual colorants are closely approximated by the Demichel equations which give the probability of a point to be located within a given colorant area (see M. E. Demichel, Procédé, Vol. 26, 1924, 17-21, 26-27 and D. R. Wyble, R. S. Berns, "A Critical Review of Spectral Models Applied to Binary Color Printing", Journal of Color Research and Application, Vol. 25, No. 1, February 2000, 4-19):

white: $a_w = (1-c) \cdot (1-m) \cdot (1-y)$ cyan: $a_c = c \cdot (1-m) \cdot (1-y)$ magenta: $a_m = (1-c) \cdot m \cdot (1-y)$ yellow: $a_y = (1-c) \cdot (1-m) \cdot y$ (2)

red: $a_r = (1-c) \cdot m \cdot y$ green: $a_g = c \cdot (1-m) \cdot y$ blue: $a_b = c \cdot m \cdot (1-y)$ black: $a_k = c \cdot m \cdot y$ where $a_w, a_c, a_m, a_y, a_r, a_g, a_b, a_k$ are the respective fractional areas of the colorants white, cyan, magenta, yellow, red (superposition of magenta and yellow), green (superposition of yellow and cyan), blue (superposition of magenta and cyan) and black (superposition of cyan, magenta and yellow).

These Demichel equations are generalized to any set of transparent inks $c_1, c_2, c_3, \ldots c_n$ in a straightforward manner. For example for obtaining the coverage values $a_i$ of all colorants which can be obtained when printing 4 inks $c_1, c_2, c_3, c_4$, we apply equation (2a):

white: $a_w = (1-c_1) \cdot (1-c_2) \cdot (1-c_3) \cdot (1-c_4)$ $c_1$ alone: $a_1 = c_1 \cdot (1-c_2) \cdot (1-c_3) \cdot (1-c_4)$ $c_2$ alone: $a_2 = (1-c_1) \cdot c_2 \cdot (1-c_3) \cdot (1-c_4)$ $c_3$ alone: $a_3 = (1-c_1) \cdot (1-c_2) \cdot c_3 \cdot (1-c_4)$ $c_4$ alone: $a_4 = (1-c_1) \cdot (1-c_2) \cdot (1-c_3) \cdot c_4$ $c_1$ and $c_2$: $a_{12} = c_1 \cdot c_2 \cdot (1-c_3) \cdot (1-c_4)$ $c_1$ and $c_3$: $a_{13} = c_1 \cdot (1-c_2) \cdot c_3 \cdot (1-c_4)$ $c_1$ and $c_4$: $a_{14} = c_1 \cdot (1-c_2) \cdot (1-c_3) \cdot c_4$ $c_2$ and $c_3$: $a_{23} = (1-c_1) \cdot c_2 \cdot c_3 \cdot (1-c_4)$ $c_2$ and $c_4$: $a_{24} = (1-c_1) \cdot c_2 \cdot (1-c_3) \cdot c_4$ $c_3$ and $c_4$: $a_{34} = (1-c_1) \cdot (1-c_2) \cdot c_3 \cdot c_4$ $c_1, c_2$ and $c_3$: $a_{123} = c_1 \cdot c_2 \cdot c_3 \cdot (1-c_4)$ $c_2, c_3$ and $c_4$: $a_{234} = (1-c_1) \cdot c_2 \cdot c_3 \cdot c_4$ $c_1, c_3$ and $c_4$: $a_{134} = c_1 \cdot (1-c_2) \cdot c_3 \cdot c_4$ $c_1, c_2$ and $c_4$: $a_{124} = c_1 \cdot c_2 \cdot (1-c_3) c_4$ $c_1, c_2, c_3$ and $c_4$: $a_{124} = c_1 \cdot c_2 \cdot c_3 \cdot c_4$ (2a)

Since the Neugebauer model does not take explicitly into account the propagation of light due to internal reflections (Fresnel reflections) at the paper-air interface, its predictions are not accurate (see H. R. Kang, Applications of color mixing models to electronic printing, Journal of Electronic Imaging, Vol. 3, No. 3, July 1994, 276-287). Yule and Nielsen (see H. R. Kang, "Color Technology for Electronic Imaging Devices", SPIE Optical Engineering Press, 1997, pp. 43-45, original reference: J. A. C. Yule, W. J. Nielsen, The penetration of light into paper and its effect on halftone reproductions, Proc. TAGA, Vol. 3, 1951, 65-76) modelled the non-linear relationship between colorant reflection spectra and predicted reflectance by a power function, whose exponent n is fitted according to a limited set of measured patch reflectances.

$$R_{tot}(\lambda) = \left( \sum_i a_i \cdot R_i(\lambda)^{\frac{1}{n}} \right)^n \quad (3)$$

The Clapper-Yule model (see F R. Clapper, J. A. C Yule, "The effect of multiple internal reflections on the densities of halftone prints on paper", Journal of the Optical Society of America, Vol. 43, 1953, 600-603), described in detail in the section "An improved Clapper-Yule based spectral color prediction model", models the internal reflections at the paper-air interface and assumes that lateral light propagation due to light scattering within the paper bulk is large compared with the period of the halftones. Therefore, the probability of light to exit from a given colorant is set equal to the colorant's fractional surface coverage.

Roger's generalized Clapper-Yule model (see G. Rogers, "A Generalized Clapper-Yule Model of Halftone Reflectance", Journal of Color Research and Application, Vol. 25, No. 6, December. 2000, 402-407) models lateral scattering within the paper as a point spread function and deduces the probabilities that light entering through a colorant n emerges from the coated paper through a colorant m, possibly traversing, due to multiple reflections, further intermediate colorants. However, the adequacy of this theoretical model for predicting the spectra of color offset patches needs to be verified.

Within the framework of their work on the reproduction of color images by custom inks, Stollnitz et. al. (see E. J. Stollnitz, V. Ostromoukhov, D. Salesin, "Reproducing Color Images Using Custom Inks", Proc. of SIGGRAPH 98, in Computer Graphics Proceedings, Annual Conference Series, 1998, 267-274) predict the reflection spectra of solid colorants by using Kubelka's layering model (see P. Kubelka, "New contributions to the optics of intensely light-scattering material, part II: Non-homogeneous layers", Journal of the Optical Society of America, Vol. 44, 1954, 330-335) for combining the paper layer and the ink layers. By applying Saunderson's correction (see J. L. Saunderson, "Calculation of the color pigmented plastics, Journal of the Optical Society of America", Vol. 32, 1942, 727-736) they take into account multiple reflections at the interface between the paper and the air as well as at the interface between the paper and the paper bulk. This model predicts the reflection spectra of colorant colors (solid inks and their combinations) which are then converted to CIE-XYZ tri-stimulus values used to predict the color of halftones according to the Neugebauer equations.

The approach we follow in the present disclosure relies on an enhancement of Clapper-Yule's model. It consists of introducing successive improvements to the Clapper-Yule model and verifying separately the benefits of each of these improvements by comparing measured halftone patch spectra and predicted spectra, for 729 patches, produced by generating all combinations of inks at nominal coverages 0%, 12.5%, 25%, 37.5%, 50%, 62.5%, 75%, 87.5% and 100%. We quantify the visual quality of color halftone patch predictions by converting measured and predicted spectra first to CIE-XYZ and then to CIE-LAB (see H. R. Kang, "Color Technology for Electronic Imaging Devices", SPIE Optical Engineering Press, 1997, pp. 8-12). The Euclidian distance ΔE in CIE-LAB space gives a measure of the visually perceived distance between measured and predicted spectra. For deriving successive model improvements, we observe the predicted and measured spectra of patches where prediction and measurement disagree (large ΔE value), try to give an explanation of the underlying phenomena (e.g. ink spreading) and propose an appropriate modellization step.

The fitting of unknown parameters is carried out by minimizing the sum of square differences between measured and predicted spectra (e.g. a 36-component vectors), i.e. by trying to deduce the optimal parameters for the considered physical phenomena.

The Basic Clapper-Yule Spectral Color Prediction Model

Among the different existing basic color prediction models (see H. R. Kang, "Applications of color mixing models to electronic printing", Journal of Electronic Imaging, Vol. 3, No. 3, Jul. 1994, 276-287), only the Clapper-Yule model (see F R. Clapper, J. A. C Yule, The effect of multiple internal reflections on the densities of halftone prints on paper, Journal of the Optical Society of America, Vol. 43, 1953, 600-603) takes simultaneously into account halftone patterns and multiple internal reflections occurring at the interface between the coated paper and the air.

The Clapper-Yule model and its enhancements are introduced below by considering coated paper as the substrate on which the inks are printed. However, any diffusely reflective substrate may be used, for example polymer or plastic.

The term "paper substrate" used hereinafter refers to the part of the paper located beneath the ink layer.

Figure 2:
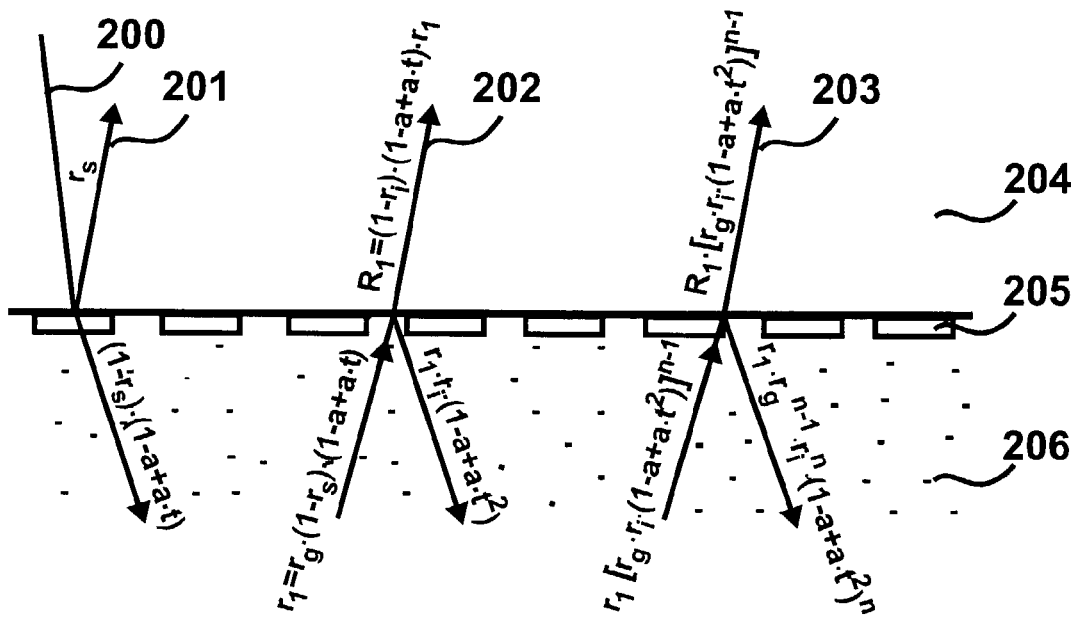
FIG. 2 shows the attenuation of light by multiple reflections on a halftone patch.

For introducing the Clapper-Yule model (see FIG. 2), we consider a single halftone ink layer 205 with a fractional surface coverage a printed on a paper substrate 206. Incident light 200 has the probability a of reaching the paper substrate by passing through the ink (transmittance $t(\lambda)$), and a probability (1−a) of reaching the paper substrate without traversing the ink layer. Since $r_s$ is the surface reflection at the air-paper interface, only portion (1−$r_s$) actually enters the coated paper. The light reaching the paper substrate is reduced by a factor (1−$r_s$)(1−a+at). It is diffusely reflected by the paper substrate according to the paper substrate reflectance $r_g(\lambda)$. Travelling upwards, it traverses the coated paper with a portion a traversing the ink and a portion 1−a traversing an area free of ink. It is reflected at the coated paper-air interface according to reflection factor $r_i$ (Fresnel reflection). A part (1−$r_i$) of the light denoted by 202 exits onto the air 204. At the first exit, the spectral attenuation of the incident light is therefore (1−$r_s$) $r_g$(1−$r_i$) (1−a+at)². The part reflected at the coated paper-air interface travels downward, is diffusely reflected by the paper and travels upwards again. At the second exit, the spectral attenuation is (1−$r_s$)·$r_g$·(1−$r_i$)·(1−a+at)²·($r_i·r_g·$(1−a+a·t²)).

With K giving the fraction of specular reflected light reaching the photospectrometer (for a 45°/0° measuring geometry, we set K=0), and by considering the light emerging after 0, 1, 2, . . . ,n−1 internal reflections 203, we obtain the reflection spectrum $$R(\lambda) = K \cdot r_s + ((1-r_s) \cdot (1-r_i) \cdot r_g \cdot (1-a+a \cdot t^2)) \cdot$$
$$(1 + (r_i \cdot r_g \cdot (1-a+a \cdot t^2)) + (r_i \cdot r_g \cdot (1-a+a \cdot t^2))^2 + \ldots +$$
$$(r_i \cdot r_g \cdot (a+a \cdot t^2))^{n-1}$$

For an infinite number of emergences, we obtain $$R(\lambda) = K \cdot r_s + \frac{(1-r_s) \cdot r_g \cdot (1-r_i) \cdot (1-a+a \cdot t)^2}{1 - r_g \cdot r_i \cdot (1-a+a \cdot t^2)} \quad (4)$$

In the case of paper printed with 3 inks such as cyan, magenta and yellow, the coverages of the resulting 8 basic colorants, i.e. white (the internal transmittance $t_w$ of white, i.e. no ink is 1 at each wavelength), cyan, magenta, yellow, red, green, blue and black are obtained according to the Demichel equations (eq. 2). By inserting the relative amounts of colorants $a_i$ and their transmittances $t_i$ in equation 4, we obtain for the predicted reflectance of a color patch printed with combinations of cyan, magenta and yellow inks $$R(\lambda) = K \cdot r_s + \frac{(1-r_s) \cdot r_g \cdot (1-r_i) \cdot \left(\sum_{j=1}^{8} a_j \cdot t_j\right)^2}{1 - r_g \cdot r_i \cdot \sum_{j=1}^{8} a_j \cdot t_j^2} \quad (5)$$

Both the specular reflection $r_s$ and the internal reflection $r_i$ depend on the refraction indices of the air ($n_1$=1) and of the paper (say $n_2$=1.5 for coated paper). According to the Fresnel equations (see E. Hecht, Schaum's Outline of Optics, McGraw-Hill, 1974, Chapter 3), for collimated light at an incident angle of 45°, the specular reflection factor is $r_s$=0.05. With light diffusely reflected by the paper (Lambert radiator), the internal reflection factor is $r_s$=0.6 (see D. B. Judd, Fresnel reflection of diffusely incident light, Journal of Research of the National Bureau of Standards, Vol. 29, November 42, 329-332).

To put the model into practice, we deduce from (4) the internal reflectance spectrum $r_g$ of a blank paper by setting the ink coverage a=0. $R_w$ is the measured blank paper reflectance.

$$r_g = \frac{R_w - K \cdot r_s}{1 + (1-K) \cdot r_i \cdot r_s + r_i \cdot R_w - r_s - r_i} \quad (6)$$

We then extract the transmittance of the individual inks and ink combinations $t_w, t_c, t_m, t_y, t_r, t_g, t_b, t_k$ by inserting in eq. 4 as $R(\lambda)$ the measured solid (100%) ink coverage reflectance $R_i$ and by setting the ink coverage a=1

$$t_i = \sqrt{\frac{R_i - K \cdot r_s}{r_g \cdot r_i \cdot (R_i - K \cdot r_s) + r_g \cdot (1-r_i) \cdot (1-r_s)}} \quad (7)$$

Figure 3:
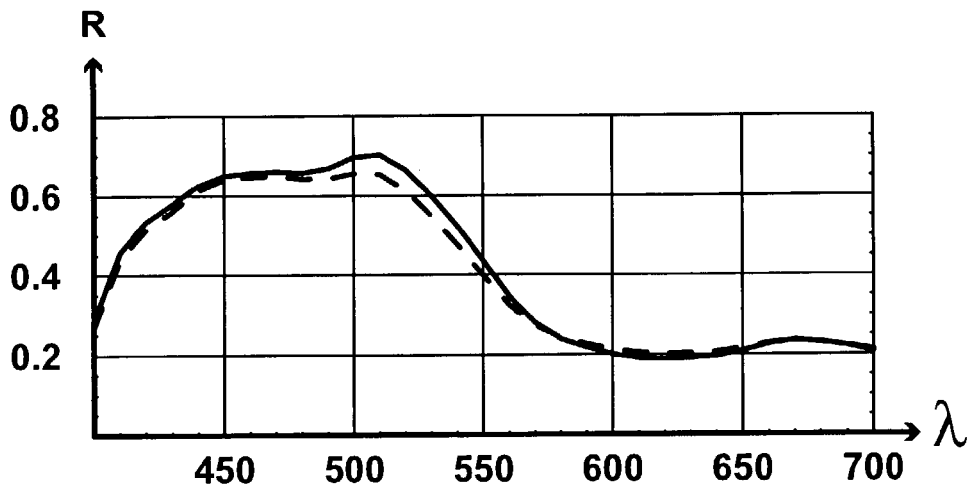
FIG. 3 shows an example of a measured (continuous line) and a predicted (dashed line) reflection spectrum according to the classical Clapper-Yule prediction model (prior art)

We must also take a possible physical dot gain into account. For each ink, we fit according to Clapper-Yule (eq. 4) the unknown physical coverages of the measured single ink patches at nominal coverages of 10%, 20%, . . . , 100% by minimizing the sum of square differences between measured spectra and predicted spectra. For the basic Clapper-Yule model, fitted single wedge cyan, magenta and yellow surface coverages are lower than the nominal surface coverages, i.e.

we obtain a negative dot gain. This is due to the fact that spectra predicted by the Clapper Yule model are darker than the corresponding measured spectra. The fitted negative dot gain tends to bring both spectra to the same levels, i.e. the predicted (FIG. 3, dashed) and measured (FIG. 3, continuous) spectra intersect each other.

An Improved Clapper-Yule Based Spectral Color Prediction Model

Spectra predicted by the Clapper-Yule model (without the negative dot gain compensation) are too dark, because according to the measured modulation transfer function of paper (see S. Inoue, N. Tsumara, Y. Miyake, Measuring MTF of Paper by Sinusoidal Test Pattern Projection, Journal of Imaging Science and Technology, Vol. 41, No. 6, November/December 1997, 657-661), light does not travel significantly more than $\frac{1}{10}$ of a millimeter within coated paper. With a screen frequency of 60 lines per centimeter (150 lines per inch), the probability that light having entered at a place having a certain ink color exits from a place of the same color is higher than the coverage of that ink color. Therefore, the basic assumption of the Clapper-Yule model, i.e. the probability of light exiting from a specific colorant being equal to that colorant coverage, is not fulfilled.

In order to set a base line for improvements, the accuracy of the basic Clapper-Yule model including physical dot gain is tested for a set of 729 patches produced by generating all combinations of inks at nominal coverages 0%, 12.5%, 25%, 37.5%, 50%, 62.5%, 75%, 87.5% and 100%. Measured and predicted spectra are converted to CIE-LAB values and the resulting error is computed. For the Clapper-Yule model, a mean error of $\Delta E=5.37$ was obtained, the maximal error is 12.1 and 577 values have a $\Delta E$ greater than 4.

In order to enhance the basic Clapper-Yule model, we assume that a certain part b of the incident light through a given colorant is reflected back and exits from the same colorant. The part (1−b) of the incoming light behaves in the same way as in the basic Clapper-Yule model described above (Eq. 5). We also make the simplifying assumption that the part b of the incident light which is reflected onto the same colorant also exits from the same colorant after one or several reflections at the coated paper-air interface.

Taking again multiple reflections into account, the attenuation of the part of the incoming light exiting from the same ink color (either no ink or ink with coverage a) at the first exit is $$(1-r_s) \cdot r_g \cdot (1-r_i) \cdot (1-a+a \cdot t^2)$$

at the $2^{nd}$ exit, the attenuation is $$(1-r_s) \cdot r_g \cdot (1-r_i) \cdot (r_g \cdot r_i) \cdot (1-a+a \cdot t^4)$$

at the $n^{th}$ exit the attenuation is.

$$(1-r_s) \cdot r_g \cdot (1-r_i) \cdot (r_g^{n-1} \cdot r_i^{n-1})[(1-a)+a \cdot$$

The sum of all light exits after an infinite number of reflections yields the spectrum $$R(\lambda) = (1-r_s) \cdot (1-r_i) \cdot \left( \frac{(1-a) \cdot r_g}{1-(r_i \cdot r_g)} + \frac{a \cdot r_g \cdot t^2}{1-(r_i \cdot r_g \cdot t^2)} \right) \quad (8)$$

While Eq. 5 (Clapper-Yule) is based on the assumption that light propagates within the substrate along a long distance, Eq. 8 is based on the assumption that light propagates along short and middle distances. Equation 8 reflects the application of the Saunderson correction accounting for multiple internal reflections at the interface between the substrate (e.g. paper) and the air (see J. L. Saunderson, Calculation of the color pigmented plastics, Journal of the Optical Society of America, Vol. 32, 1942, 727-736): the first term models the substrate (e.g. paper) without ink (internal reflectance $r_g$) and the second term the substrate (e.g. paper) printed with solid ink (internal reflectance $r_g \cdot t^2$).

The enhanced model (Eq. 9) comprises a part b of light propagated along short and middle distances (Eq. 8) and a part (1−b) of the light propagated along long distances (Eq. 5).

$$R(\lambda) = K \cdot r_s + (1-r_s) \cdot r_g \cdot \qquad (9)$$

$$(1-r_i) \cdot \left[ b \cdot \sum_{j=1}^{8} \frac{a_j \cdot t_j^2}{1-r_i \cdot r_g \cdot t_j^2} + (1-b) \cdot \frac{\left(\sum_{j=1}^{8} a_j \cdot t_j\right)^2}{1-r_g \cdot r_i \cdot \sum_{j=1}^{8} a_j \cdot t_j^2} \right]$$

When fitting simultaneously the spectra of single ink coverages (dot gain of individual inks) and the parameter b (ratio of the incident light reflected back to the same colorant), one obtains values of b between 0.45 and 0.7. For standard offset printing, i.e. screens mutually rotated by 30° and a screen frequency of 150 lines (screen elements) per inch, the fraction b of the light exiting from the same color as the incoming light yielding the smallest mean error for all considered test patches is b=0.6.

Figure 4:
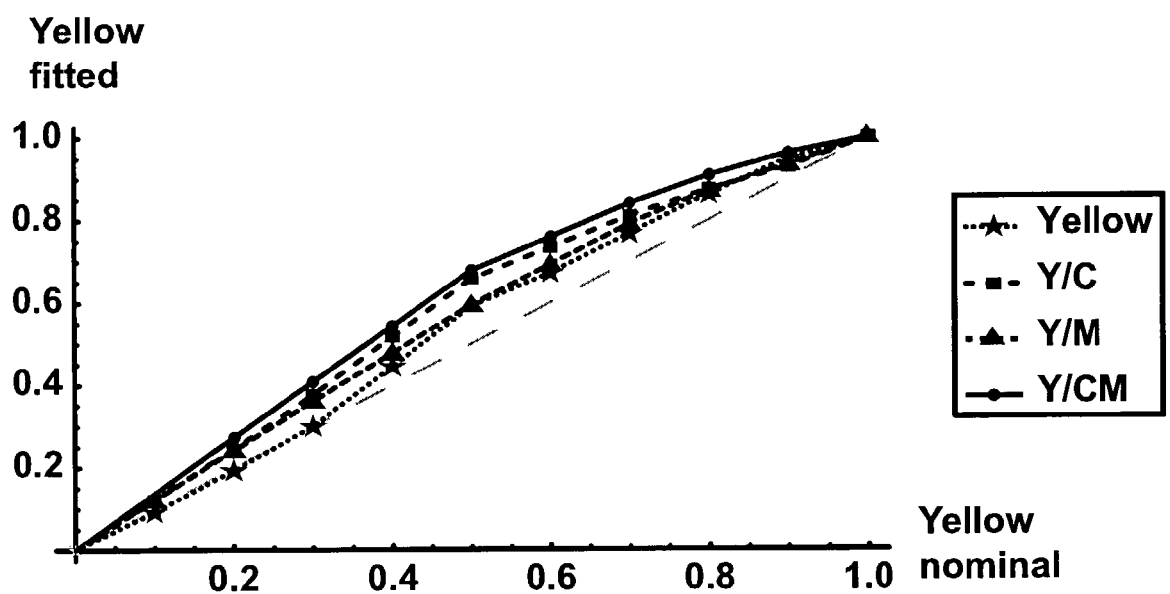
FIG. 4. shows an example of the tone reproduction curves for yellow alone, yellow over solid cyan, yellow over magenta and yellow over solid cyan and magenta.

In offset printing, trapping, i.e. the different thicknesses of successive ink layers when several inks are printed one on top of another, is generally considered to be a problem (see H. Kipphan, Handbook of Print Media, Springer-Verlag, 2001, pp. 103-105 and A. Stanton, G. Raencic, Ink Trapping and Colorimetric Variation, Proc. TAGA 2001, 258-281). Our model automatically takes care of trapping by computing the internal transmittances of the red, green, blue and black colorants according to equation 7. However, we observed an ink spreading phenomenon when a second ink is printed over a first ink or when a third ink is printed on top of two inks. In the same way as physical dot gain, ink spreading tends to reduce the reflection spectra, i.e. it yields slightly darker colors (FIG. 4).

Since, in the considered printing process, offset inks are printed by first depositing cyan, then magenta and then yellow, we fit the respective ink spreaded coverages of magenta over solid (i.e. 100%) cyan $f_{m,c}(m)$, yellow over solid cyan $f_{y,c}(y)$, yellow over solid magenta $f_{y,m}(y)$ and yellow over solid cyan and magenta $f_{y,cm}(y)$ by minimizing the square differences between measured spectra and spectra predicted according to equation (9). Together with the single ink coverages $f_c(c)$, $f_m(m)$, $f_y(y)$ this yields the ink coverage curves 501 shown in FIG. 5.

Figure 5:
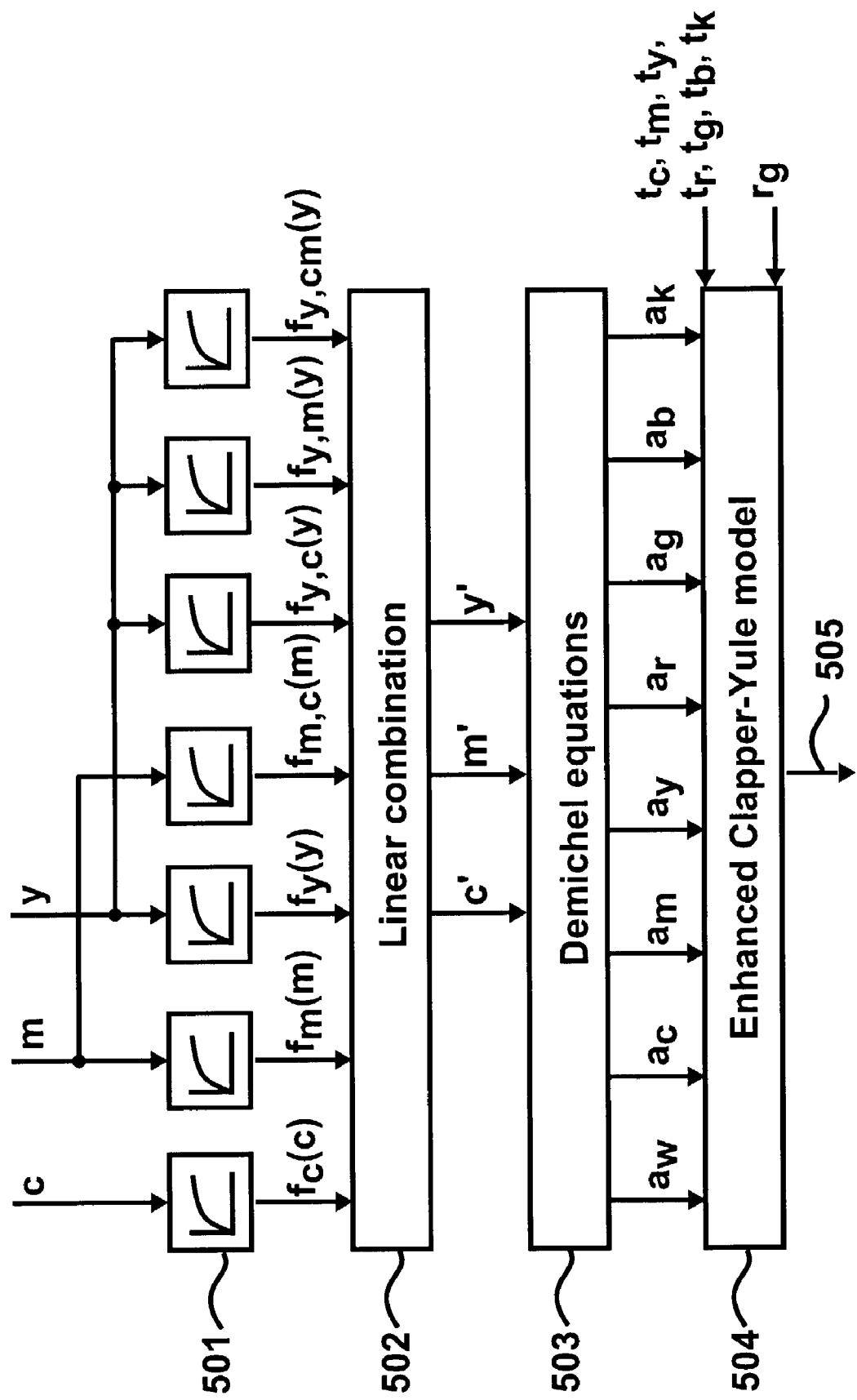
FIG. 5. shows a diagram of the disclosed enhanced Clapper-Yule model taking also into account dot gain and ink spreading.

In front of the enhanced Clapper-Yule model, we therefore introduce a stage taking into account dot gain and ink spreading (FIG. 5, 501 and 502).

An input nominal color with coverages cmy is converted (by 501 and 502) to an intermediate color with coverages c'm'y' obtained as a weighted sum of dot gain and ink spreading contributions. The weighting coefficients are given by the respective effective colorant coverages.

$c'=f_c(c)$ effective coverage of the cyan ink, which is printed first; \qquad (10)

$m'=f_m(m)(1-c')+f_{m,c}(m)c'$: effective amount of magenta due to magenta printed alone and magenta printed on top of cyan (blue);

$y'=f_y(y)(1-c')(1-m')+f_{y,m}(y)(1-c')m'+f_{y,c}(y)c'(1-m')+f_{y,c}(y)c'm'$: effective amount of yellow due to yellow printed alone, yellow printed on top of magenta (red), yellow printed on top cyan (green) and yellow printed on top of cyan and magenta (black).

The colorant coverages are obtained from the c'm'y' values according to the Demichel equations (2), see also FIG. 5, 503. With the enhanced Clapper-Yule model 504 and by taking single ink coverages (physical dot gain) and ink spreading into account, a mean error between predicted reflection spectra (505) and measured reflection spectra (in the present case 729 spectra) of $\Delta E=2.36$ was obtained, the maximal error is $\Delta E=7.09$ and only 64 values have a $\Delta E$ greater than 4. This model is very stable and is well adapted to the underlying physical phenomena, since its only free variables are the surface coverages (physical dot coverage and ink spreading) and the ratio b related to the lateral propagation of light. All its internal transmission and reflection spectra are calculated (rather than fitted as in E. J. Stollnitz, V. Ostromoukhov, D. Salesin, Reproducing Color Images Using Custom Inks, Proc. of SIGGRAPH 98, in Computer Graphics Proceedings, Annual Conference Series, 1998, 267-274).

In the case of a different printing process, when the same cyan, magenta, and yellow inks are printed in a different order, Eq. 10 reflecting physical dot gain (also called mechanical dot gain) and ink spreading must be modified accordingly.

In the case of transparent inks $c_1, c_2, c_3$ printed in the order $c_1, c_2, c_3$, the values $c_1', c_2', c_3'$ for the effective amounts of inks taking into account physical dot gain and ink spreading are obtained by replacing in equation 10 cyan (c) by $c_1$, magenta (m) by $c_2$, and yellow (y) by $c_3$. With the same logic of taking into consideration the effective colorant coverages, one may extend equation 10 in order to also predict the spectra of more than 3 transparent inks, for example 4 custom transparent inks or the standard inks cyan, magenta, yellow and black.

A Prediction Model for Transparent Inks Printed on Top of Metallic Inks

Metallic inks are generally formed by flat metal (aluminium) particles floating within a liquid binder. The particles tend to align themselves horizontally along the surface of the ink film (leafing effect). A higher leafing effect yields a more metallically looking ink surface (see Kern G. M., Micale J., Lavelle S., Valenzuela P., "Hiding power of aluminium pigments in printed ink films", American Ink Maker, vol 69, no 10, October 91, 60-68). As is the case for metallic surfaces, a coated paper printed with a metallic ink reflects a significant part of the incoming light in and around the specular direction, and an additional part of the light diffusely in all directions.

Figure 7:
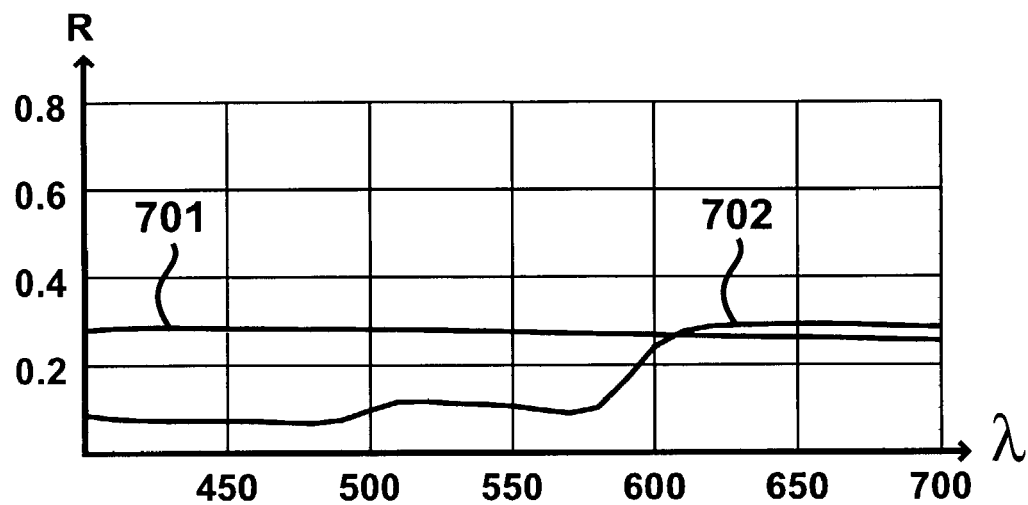
FIG. 7 shows the reflection spectra of silver alone 701 and solid magenta plus solid yellow printed on top of solid silver 702.

According to the concentration of the metallic particles, the metallic ink layer also absorbs part of the incoming light flux and transmits another part of the incoming light flux onto the underlying substrate (e.g. coated paper). Due to the fact that the metallic particles float within the binder, light reflected by theses particles is also partly reflected, at the binder-air interface, back into the metallic layer, yielding diffuse multiple reflections. We would like to predict the reflection spectra of transparent inks (e.g. $c_s m_s y_s$) printed on top of a metallic ink (for example silver s), when measured under non-specular reflection conditions. Standard photospectrometers have a geometry of 45/0 degrees, i.e. the incident angle is 45 degrees and the exit angle is 0 degree. Spectrometric reflection measurements (FIG. 7) carried show that for a specific metallic ink, 26% to 27% of the incident light is reflected by the solid metallic ink printed on a coated paper at 0° exit angle (similar values for all wavelengths). In a first approximation, for the 45°/0° measuring geometry, we model the two phenomena, i.e. the decrease in reflected light by metallic particles due to the 0° exiting angle and the absorption of light traversing the metallic layer by an equivalent ink layer having a specific internal transmittance. Its transmittance $t_s$ is obtained by measuring the reflectance $R_s$ of a solid metallic (silver) ink patch and inserting it into equation (7).

Patches printed with one or several inks over a solid metallic ink (e.g. silver) show a strong trapping phenomenon, i.e. only a fraction of the ink that should be printed is effectively printed on top of a metallic ink. Note that when printing a transparent solid ink over a second transparent solid ink, trapping has generally the effect of reducing the ink thicknesses of the first, of the second or of both transparent inks. However, when printing a transparent ink on top of a metallic ink, trapping not only reduces the ink thickness of the transparent ink, but also tends to leave small areas of the metallic ink uncovered. Hereinafter, we use the term trapping in the context of printing one or several transparent inks on top of a metallic ink.

To predict the reflection spectra of transparent inks printed over a metallic ink, we extend the enhanced Clapper-Yule model described in section "An improved Clapper-Yule based spectral color prediction model" by including the internal transmittance $t_s$ of the equivalent metallic ink layer into equation (9) and by taking trapping into account. In equation (9), since the considered inks are transparent, instead of individual colorant transmittances $t_j$, we use transmittances $$t_{sj}=t_s t_j \qquad (11)$$

Trapping is taken into account by replacing the ink spreading and dot gain effects by the trapping effect.

The considerations above also apply to the case where instead of a metallic ink, one uses other types of specular reflective supports such as a metallic substrate or a metallic foil. It is important that a part of the incident light traverses the metallic layer, reaches the underlying diffusely reflective support and is reflected back and/or that the incident light be partly diffusely reflected by the metallic layer. Hereinafter, these kinds of supports will simply be called "metallic layer". We also use the term "surface coverage" in the case of a metallic layer, since the metallic layer may be "halftoned", i.e. perforated according to a specific halftone perforation mask. In addition, the metallic layer is shaped according to the patterns' mask. Therefore all considerations made for a metallic ink also apply to the case of a metallic layer.

Modelling the Trapping Effect When Printing on Top of a Metallic Ink

In the case of printing a transparent ink on top of a metallic ink, trapping is mainly due to the poor adherence of the transparent ink. Only a portion of the transparent ink is transferred onto the metallic ink layer. Parts of the metallic ink layer remain uncovered. When a second transparent ink is printed on top of a first transparent ink over a metallic ink, trapping further decreases the coverage of the second ink. At the same time, the first transparent ink may spread out, possibly due to the better adherence properties of the second ink or due to the pressure produced when printing the second ink layer. Therefore the observed surface coverages represent trapping and also to a certain extend, ink spreading.

The approach we follow in order to take trapping into account when printing on top of a metallic ink is to first fit the surface coverages of each transparent ink alone. For example, for the cyan, magenta and yellow inks, we obtain the trapped coverage curves $h_c(c)$, $h_m(m)$, $h_y(y)$ for respectively the cyan, magenta and yellow single inks printed over the metallic ink (single ink coverage curves, dotted line with star sign, FIGS. 6A, 6B, 6C). We then fit the surface coverage of each ink superposed with one of the other solid inks (dashed curves, with square or triangle signs in FIGS. 6A, 6B, 6C). This yields in our example 6 trapping coverage curves: the trapping of magenta superposed with solid yellow $h_{m,y}(m)$, of yellow superposed with solid magenta $h_{y,m}(y)$, of cyan superposed with solid yellow $h_{c,y}(c)$, of yellow superposed with solid cyan $h_{y,c}(y)$, of cyan superposed with solid magenta $h_{c,m}(c)$ and of magenta superposed with solid cyan $h_{m,c}(m)$. Finally, we fit the individual trapping coverages of one ink printed in superposition with two solid inks (continuous curves with circular dots, FIGS. 6A, 6B, 6C). We obtain three trapping coverage curves for respectively the cyan, magenta and yellow coverages in combination with the two other solid inks, i.e. $h_{c,my}(c)$ $h_{m,cy}(m)$, $h_{y,cm}(y)$. All fitting operations are carried out with the enhanced Clapper-Yule model extended to a solid metallic ink by minimizing the sum of square differences between predicted and measured spectra. The enhanced Clapper-Yule model is extended to a solid metallic ink by considering the specific internal transmittance of the metallic ink layer according to Eq. 11 and by taking into account the raised metallic reflection spectrum (see next section).

Figure 6A:
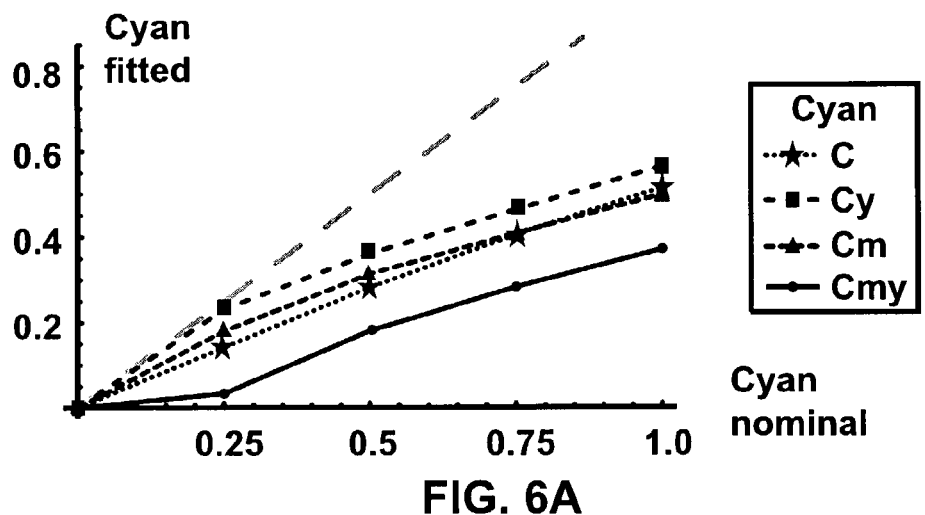
FIGS. 6A, 6B and 6C show the reduced surface coverage values of transparent inks printed on top of a metallic ink, either alone, or in superposition with one or two other solid transparent inks.
Figure 6B:
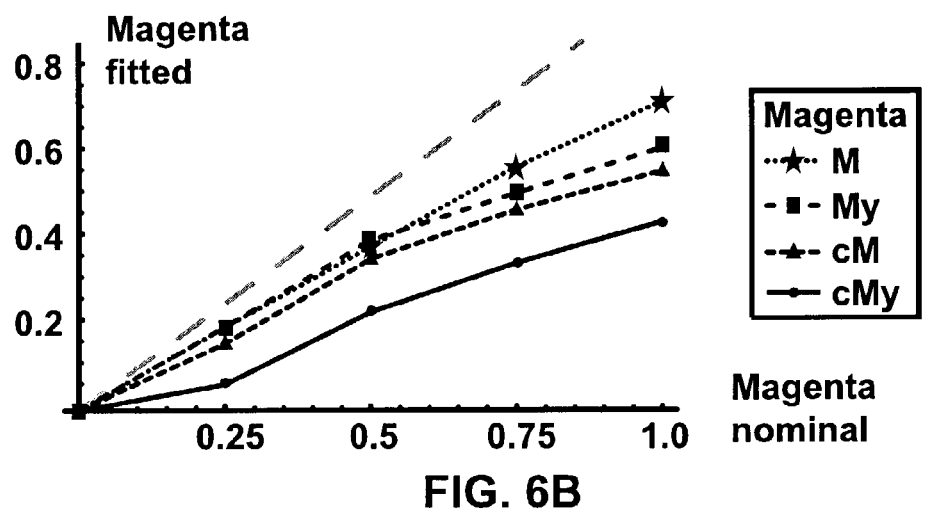
Figure 6C:
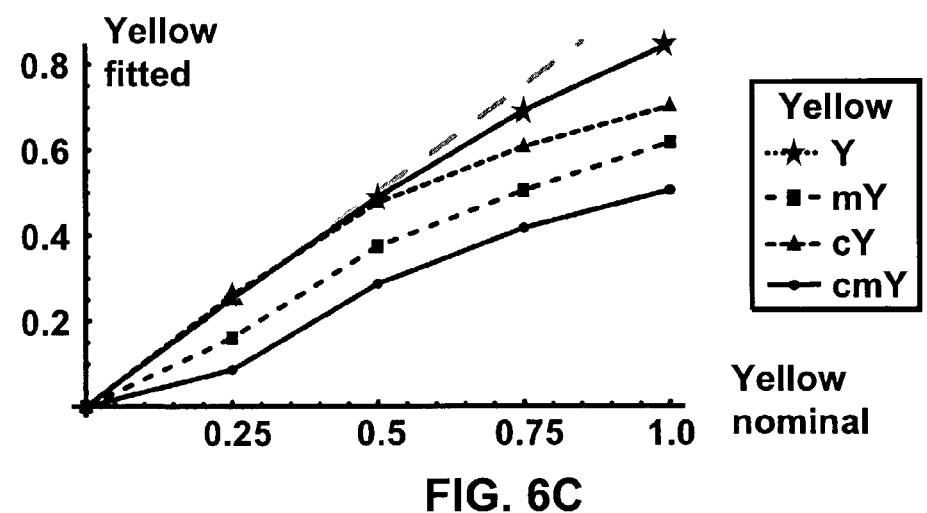

The trapped ink coverages for the considered examples are illustrated in FIG. 6. Input values are nominal ink coverages and output values are the fitted trapped ink coverages. Due to trapping, the ink coverage tends to decrease when increasing the number of superposed inks. However, when a second ink is printed on top of a first ink, due to its improved adherence or pressure, there is also a tendency to increase the coverage of the first ink. In the present case, cyan overprinted by yellow tends to have a slightly larger coverage than cyan alone (FIG. 6A). We have a strongest decrease in individual ink coverages when three inks are superposed. The order in which the inks are printed is important. The ink coverage for the first ink (cyan) alone or in combination with a second ink is increased (FIG. 6A). When the second ink (magenta) is printed on top of the first ink (cyan) it exhibits a stronger ink reduction than when printed alone (FIG. 6B). For the third ink (yellow), this phenomenon is even more pronounced: the third ink (yellow) printed on top of the second ink (magenta) or of the first ink (cyan) has a considerable coverage reduction and on top of both the first and second inks (cyan and magenta) has the largest coverage reduction (FIG. 6C).

Equations (10) allow to compute trapped coverage values by weighting the contributions of the trapped coverages of a single ink, of one ink superposed with one solid ink and of one ink superposed with two solid inks. Weighting factors are established by reasoning in a similar terms as for establishing the Demichel equations (eq. 2), i.e. by considering nominal (e.g. c,m,y) and trapped (e.g. $c_t,m_t,y_t$) ink coverages. Trapped ink coverages are fitted for nominal coverages of the considered inks (one ink alone, one ink superposed with one or two solid inks). Therefore, the weight of the trapping coverage $h_{ij}(i)$ of one ink i superposed with a second ink j is proportional to the nominal coverage $c_j$ of that ink. Furthermore, it is proportional to the amount of the available effective surface, i.e. one minus the trapped (effective) coverage of a non-contributing ink. Weighting factors are normalized so as to ensure that their sum is one. We obtain equations (12).

$$c_t = [h_c(c) \cdot (1 - m_t) \cdot (1 - y_t) + h_{c,m}(c) \cdot m \cdot (1 - y_t) + \qquad (12)$$
$$h_{c,y}(c) \cdot y \cdot (1 - m_t) + h_{c,my}(c) \cdot m \cdot y]/p_c$$

$$m_t = [(h_m(m) \cdot (1 - c_t) \cdot (1 - y_t) + h_{m,c}(m) \cdot c \cdot (1 - y_t) +$$
$$h_{m,y}(m) \cdot y \cdot (1 - c_t) + h_{m,cy}(m) \cdot c \cdot y]/p_m$$

$$y_t = [h_y(y) \cdot (1 - c_t) \cdot (1 - m_t) + h_{y,c}(y) \cdot \cdot (1 - m_t) +$$
$$h_{y,m}(y) \cdot m \cdot (1 - c_t) + \cdot h_{y,cm}(y) \cdot c \cdot m]/p_y$$

The normalizing factors $p_c$, $p_m$ and $p_y$ are given by the sum of the weighting coefficients, i.e. for inks i, j, k with nominal coverages $c_i$, $c_j$ and $c_k$ and trapped coverages $c_{it}$, $c_{jt}$ and $c_{kt}$ $$p_i = (1-c_{jt}) \cdot (1-c_{kt}) + c_j \cdot (1-c_{kt}) + c_k \cdot (1-c_{jt}) + c_j \cdot c_k$$

One obtains the trapped coverages values $c_t,m_t,y_t$ by applying equation (12) iteratively, with starting values of the trapped ink coverage values equal to the nominal coverage values. The system converges after a few iterations. These equations represent a relatively coarse approximation of the complex phenomenon of printing with several transparent inks on top of a metallic ink. However, they yield good results (see section "Successive accuracy improvements").

Raised Metallic Reflection Spectrum

Taking into account trapping is not yet sufficient for building an accurate prediction model. A detailed analysis of the spectra of colors printed on top of a metallic ink reveals that the ink printed on top of the metallic ink has the effect of raising the metallic ink's non-specular reflection values. For example, the measured reflectance of solid magenta and solid yellow printed on top of the solid silver ink is higher in the red part of the spectrum (702 in FIG. 7) than the reflection spectrum of silver alone (701 in FIG. 7).

We model the raised metallic reflection spectrum by a scalar raising factor. Metallic ink reflection spectra raising factors are obtained by fitting them at the same time as fitting the reduced surface coverages due to trapping for one solid ink and for the superpositions of two solid inks. Since the superposition of 3 solid inks (black) absorbs light in all spectral bands, the metallic reflection spectrum does not need to be raised. When printing separately with solid cyan, magenta and yellow on top of silver, one obtains the respective fitted raising factors (804 in FIG. 8) of cyan $f_{rc}$ (e.g. $f_{rc}=1.069$), of magenta $f_{rm}$ (e.g. $f_{rm}=1.15$), and of yellow $f_{ry}$ (e.g. $f_{ry}=1.16$). When printing with solid magenta and yellow (red), cyan and yellow (green) and cyan and magenta (blue) on top of silver, one obtains the respective fitted raising factors (804 in FIG. 8) of red $f_{rr}$ (e.g. $f_{rr}=1.25$), green $f_{rg}$ (.e.g. $f_{rg}=1.47$) and blue $f_{rb}$ (e.g. $f_{rb}=1.31$). For the metallic ink alone and for the superposition of solid cyan, magenta and yellow (black), the metallic reflection spectrum is not raised, i.e. $f_{rw}=1$ and $f_{rb}=1$. The raising factor $f_R$ (806 in FIG. 8) is a weighted mean (805 in FIG. 8) of the individual raising factors, the weights being given by the nominal amounts of colorants (Eq. 2).

In the case of transparent inks $c_1$, $c_2$, $c_3$ one may apply the same considerations and fit the raising factors for single inks on top of the metallic ink, for the combination of two inks on top of the metallic ink and possibly for the combination of three inks on top of the metallic ink.

Figure 8:
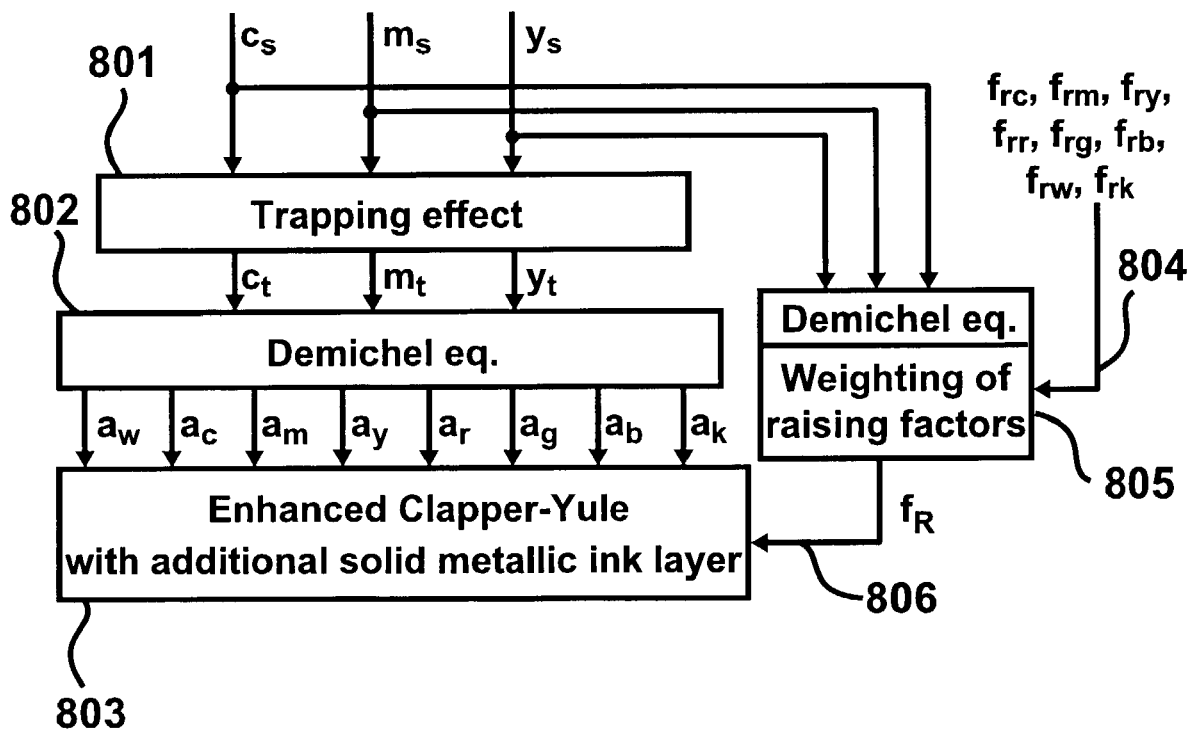
FIG. 8 shows the elements of the prediction model for predicting the spectra of inks printed on top of a solid metallic ink.

This raising factor $f_R$ raises the initially measured metallic ink reflection spectrum (45°/0° measurement geometry), from which the equivalent transmission spectrum $t_s$ of the metallic ink layer is computed according to equation (7). The resulting complete prediction model for predicting the spectra of inks printed over a metallic ink is shown in FIG. 8. It incorporates the individual raising factors 804, the raising factor weighting 805, the resulting raising factor 806, the modellization of trapping 801, the combination of the trapped coverages to obtain the colorants according to the Demichel equations 802 and the enhanced Clapper-Yule model modelling the additional solid metallic ink layer by its equivalent internal transmittance 803.

For predicting the spectrum of a patch printed with an effective surface coverage s of a metallic (silver) ink, we compute the part s of the spectrum according to the prediction model introduced in the present section taking trapping and enhanced metallic ink reflection spectrum into account and the part (1−s) according to the enhanced Clapper-Yule prediction model introduced in section "An improved Clapper-Yule based spectral color prediction model".

$$R_{tot}(\lambda) = s \cdot R_{scmy}(\lambda) + (1-s) \cdot R_{cmy}(\lambda) \quad (13)$$

In order to take into account the dot gain of the metallic ink (e.g. silver), the effective surface coverage s of the metallic ink is fitted according to equation (13), for the case of nominal coverages $s_{in}$ of 10%, 20%, 30%, ..., 100% of the metallic ink alone, printed over the considered substrate (e.g. coated paper). This yields the fitted silver surface coverage s as a function of the nominal input coverage $s_{in}$, i.e. $s(s_{in})$.

The enhanced Clapper-Yule model extended to a metallic ink modellizing trapping and metallic ink spectrum raising corrections allows to accurately predict the color of a patch printed with freely chosen coverages of transparent inks (e.g. cyan, magenta, yellow) and up to 100% metallic ink (e.g. silver). Our example test set was produced with variations of cyan, magenta, yellow inks at 0%, 25%, 50%, 75% and 100% nominal coverages and the silver ink at 10%, 30%, 50%, 80% and 100% yielding 625 samples. The comparison between predicted and measured spectra (prediction accuracy comparison table shown in section "Successive accuracy improvements") yields excellent results, similar to the results obtained when predicting the spectra of transparent inks (mean prediction error CIE-LAB $\Delta E = 2.37$).

Calibrating the Metallic Ink Printing Process

We need to match the colors of patches printed with transparent ink coverages $c_1, c_2, c_3$ (e.g. cmy) by respectively the colors of patches printed by the superposition of a metallic and transparent inks with coverages $s, c_{1s}, c_{2s}, c_{3s}$ (e.g. $sc_s m_s y_s$ coverages). With our prediction model for transparent inks, we may predict the reflection spectrum of patches printed by transparent inks for a set of nominal coverages values. With the model for predicting the spectrum of colors printed with a metallic ink (eq. 12), we may then fit corresponding $s, c_{1s}, c_{2s}, c_{3s}$ (e.g. $sc_s m_s y_s$) coverages by minimizing the sum of square differences between the reflection spectrum predicted for the transparent ink patch and the reflection spectrum predicted for the patch printed by superposing the metallic ink and transparent ink (metallic ink patch). Matching the reflection spectra of the transparent ink patch and of the metallic ink patch yields also a match of the color of these patches, since colors (CIE-XYZ tri-stimulus values) are derived from reflection spectra (see H. R. Kang, Color Technology for Electronic Imaging Devices, SPIE Optical Engineering Press, 1997, 8-12).

We construct for the desired coverage of the metallic ink a lookup table preferably made of a rectilinear 3D grid in the cyan, magenta, yellow output color space by considering for example nominal $c_1, c_2, c_3$ (e.g. cmy) input surface coverages of 0%, 12.5%, 25%, 37.5%, 50%, 62.5%, 75%, 87.5% and 100%. Each grid point associates to nominal $c_1, c_2, c_3$ (e.g. cmy) transparent ink coverages corresponding $s, c_{1s}, c_{2s}, c_{3s}$ (e.g. $sc_s m_s y_s$) coverages for the superposition of the transparent inks and the metallic ink. With for example a C++ program implementing Powell's function minimization method (see W. H. Press, B. P. Flannery, S. A. Teukolsky, W. T. Fetterling, Numerical Recipes, Cambridge University Press, 1st edition, 1988, section 10.5, pp. 309-317), the creation of the 3D lookup table takes 65 minutes on a 600 MHz Pentium III computer.

When replacing transparent inks by the superposition of a metallic ink and transparent inks, we may ask for a given silver surface coverage s, and the system will try to find a solution by fixing s and trying to fit the $c_{1s}, c_{2s}, c_{3s}$ (e.g. $c_s m_s y_s$) coverages so as the minimize the sum of square differences between the predicted $s, c_{1s}, c_{2s}, c_{3s}$ (e.g. $sc_s m_s y_s$) reflectance spectrum and the reflectance spectrum predicted for the input $c_1, c_2, c_3$ (e.g. cmy) values. However, in highlight tones, it is impossible to ask for a high coverage of silver, i.e. the fitting process may not return a valid solution. In these cases, the required coverage s of silver can be successively lowered, for example in steps of 5%, until a possible solution is found. For some applications, it is useful to save at each grid location the effective coverage of the metallic ink that can be obtained.

In order to hide within an image patterns at non-specular observation angles, which are to be revealed at specular reflection angles, a colorimetric difference value of $\Delta E < 2$ between patches printed with transparent inks and corresponding patches printed with metallic inks is required. To allow for a sufficient metallic ink coverage, patterns should therefore preferably be hidden in darker image areas.

Synthesizing images with embedded visible metallic microstructures (FIG. 9) is less critical. In the case that all the microstructure foreground is rendered with a metallic ink, a significant color deviation between predicted and measured metallic colors (e.g. $\Delta E = 4$) may be tolerated.

Once the 3D lookup table is created, the program which synthesizes the hidden metallic ink patterns receives as input a mask (also called pattern mask) specifying the areas to be printed with metallic ink. Initial transparent ink coverages $c_1, c_2, c_3$ (e.g. cmy) at pixels located within the mask are converted by tri-linear interpolation with the help of the 3D lookup table into metallic+transparent ink coverages $s, c_{1s}, c_{2s}, c_{3s}$ (e.g. $sc_s m_s y_s$). Input pixels located outside the mask are simply transferred as they are to output transparent ink coverages, i.e. $c_{1s} = c_1, c_2 S = c_2, c_3 s = c_3$ (e.g. $c_s = c, m_s = m, y_s = y$). The color output layers may be halftoned in the same way as for standard offset printing, for instance with screen frequencies of 150 lpi and standard screen angles 15, 45, 75 and 0 degrees for respectively the $c_1$ (e.g. cyan), s (e.g. silver), $c_2$ (e.g. magenta) and $c_3$ (e.g. yellow) layers. However any other suitable combination of screen frequencies and angles where the superposition of the layers does not induce visible moirés will also work. It is also possible to use stochastic screens.

The same 3D lookup table can be used for the color separation of images into the superposition of transparent inks and a metallic ink (see section "Steps for carrying out the color separation with a metallic ink" below).

Design Examples

The following examples describe possible embodiments of the invention. Main applications are security documents, but other applications are possible. Further embodiments beyond the ones shown below are possible.

Figure 9:
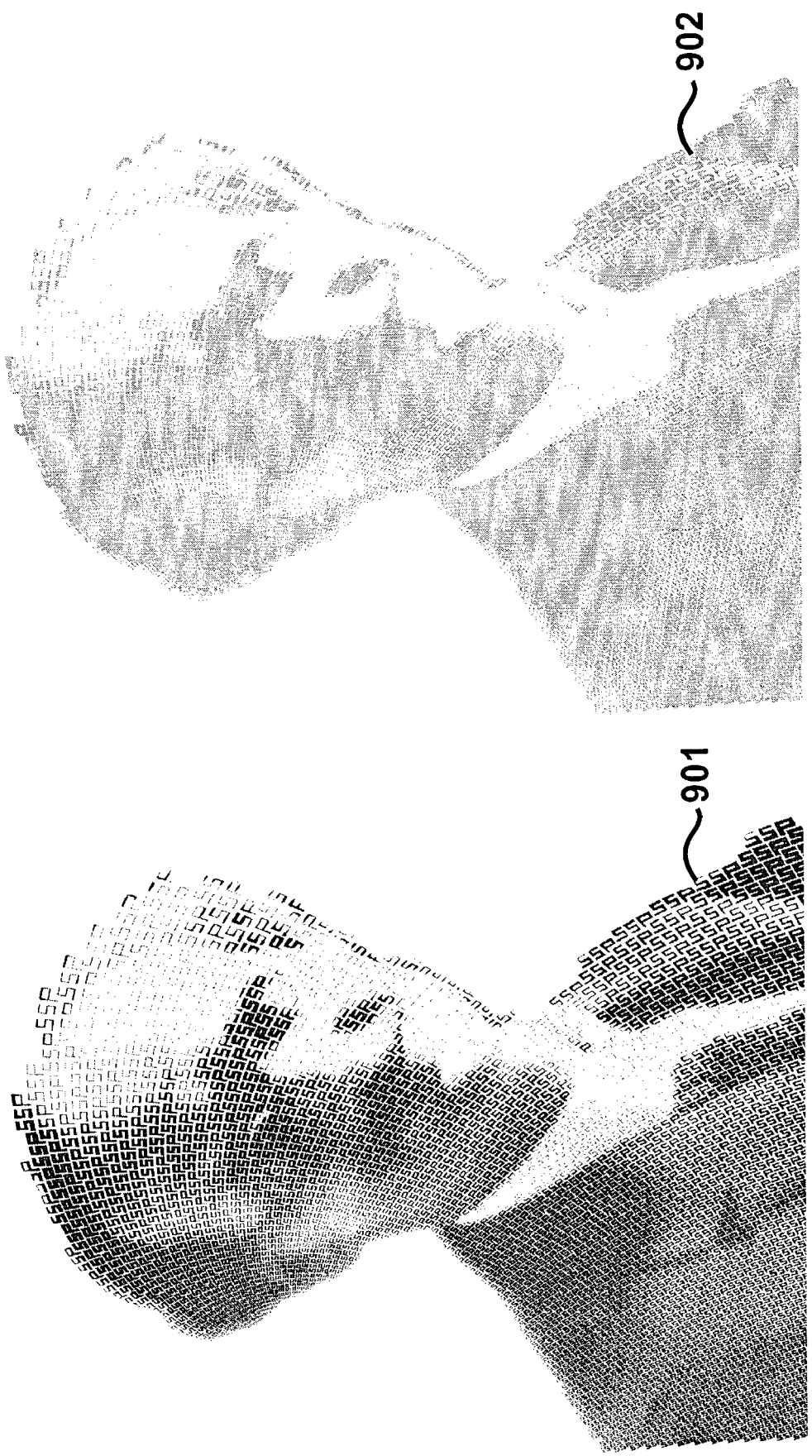
FIG. 9 shows a design example rendered with a warped microstructure enhanced with a metallic ink.

In the first category of design examples, we would like to enhance the microstructure patterns (printed with a metallic ink) embedded into a color image at specular reflection angles and to reduce the visibility of the other image parts. FIG. 9 shows a sample bank note dedicated to Professor Auguste Piccard, who, in 1931, was the first man to explore the stratosphere in a balloon specially conceived by him.

The banknote's main motive, Piccard's portrait, is initially given by a grayscale image to be rendered by combining a single Pantone color and the paper white. Piccard's portrait is reproduced with two superposed image layers. A first image layer renders the portrait with standard clustered dot halftones. A second image layer reproduces the portrait with warped microstructure shapes representing the "SSP" logo. This second layer forming the pattern mask is rendered thanks to artistic screening, a method for creating images by carefully designed microstructure shapes, which change according to the local image intensity level (see U.S. Pat. No. 6,198,545, Method and apparatus for generating halftone images by evolutionary screen dot contours, inventors Ostromoukhov, Hersch, issued Mar. 6, 2001, and the article by V. Ostromoukhov, R. D. Hersch, "Artistic Screening", Siggraph95, Computer Graphics Proceedings, Annual Conference Series, 1995, pp. 219-228). The foreground of this second layer incorporating the microstructure shapes (letters) is rendered with a silver ink at 70% coverage and with coverages of cyan, magenta, and yellow matching at non-specular angles the cmy color separations of the selected Pantone color.

When viewed from a large distance at non-specular viewing angles, mainly the portrait is visible. By reducing the viewing distance, the microstructure patterns "SSP" become apparent (FIG. 9, 901). When seen from nearby under specular light reflection (e.g. by tilting the picture), mainly the microstructure outline printed with the metallic ink is visible (FIG. 9, 902). Its high contrast with the background tends to reduce the visibility all other image elements. Mainly the outline of the face rendered with the metallic ink microstructure remains visible. This very striking effect may be used as a visual authentication feature. Since photocopiers are not capable of reproducing images with metallic inks, the microstructure enhancement and background visibility reduction effects at specular viewing angles are lost in photocopied documents.

The second category of design examples relies on the inversion effect. A pattern printed with metallic inks is dark at non-specular viewing angles and highlight at specular viewing angles.

Figure 10:
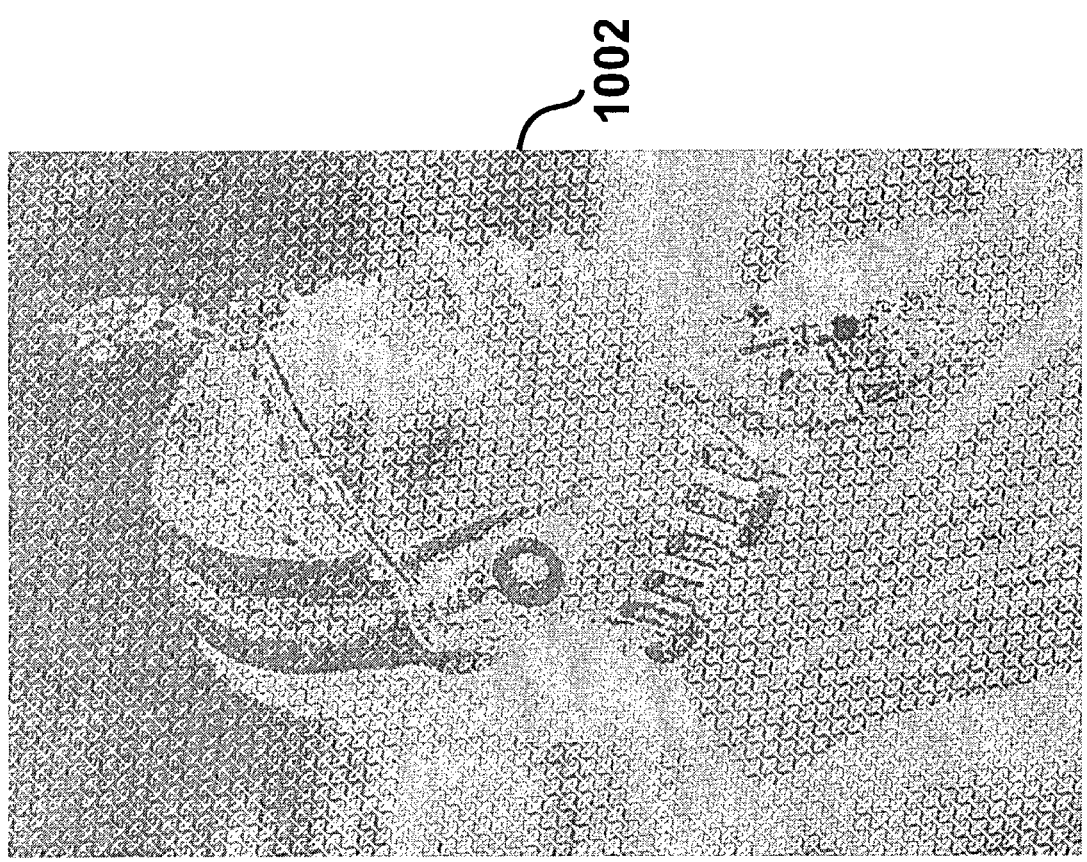
FIG. 10 shows at non-specular and specular viewing angles a metallic ink microstructure image embedded in a color wedge rendered with a metallic ink.
Figure 10:
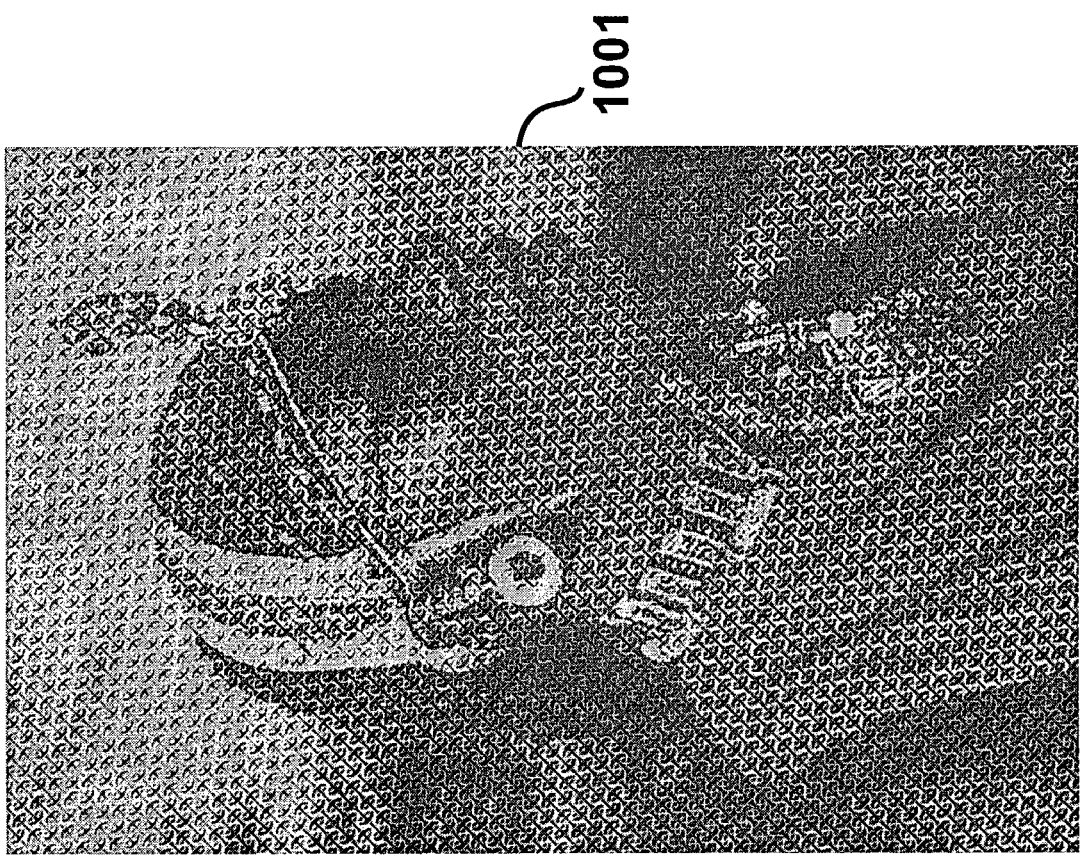
Figure 11:
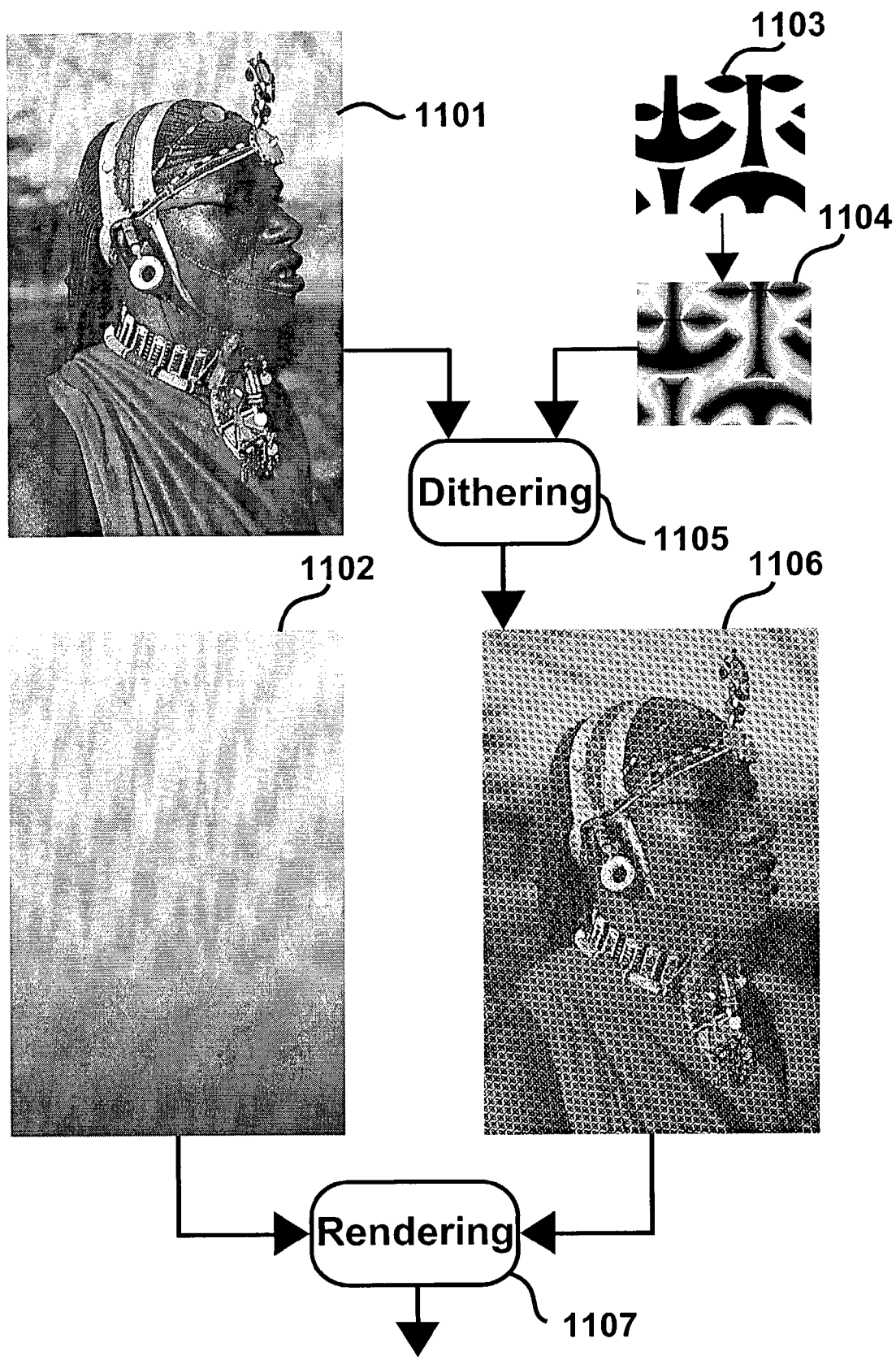
FIG. 11 gives a diagram explaining how to produce the metallic ink microstructure image of FIG. 10.

With metallic ink microstructures embedded into images, the transition between dark and highlight microstructures may produce interesting effects. FIG. 10 shows the image of a Masai fighter embedded into a color wedge. By tilting the figure, the inversion effect modifies the fighter image: the image is first dark 1001, then partially hidden within the color wedge and finally appears at a specular viewing angle as highlight 1102. To produce the picture (FIG. 11), we first halftone the image of the Masai fighter 1101 with a dither matrix 1104 incorporating the microstructure pattern 1103. The resulting halftoned binary image 1106 is then used as the pattern mask for rendering 1007 the color wedge 1102 by combining the metallic ink and the transparent inks. To ensure that the microstructure patterns also appear at non-specular reflection angles as dark patterns within the wedge, the amount of metallic ink may be slightly increased, for example by 10%, before creating the final color separations.

Figure 12:
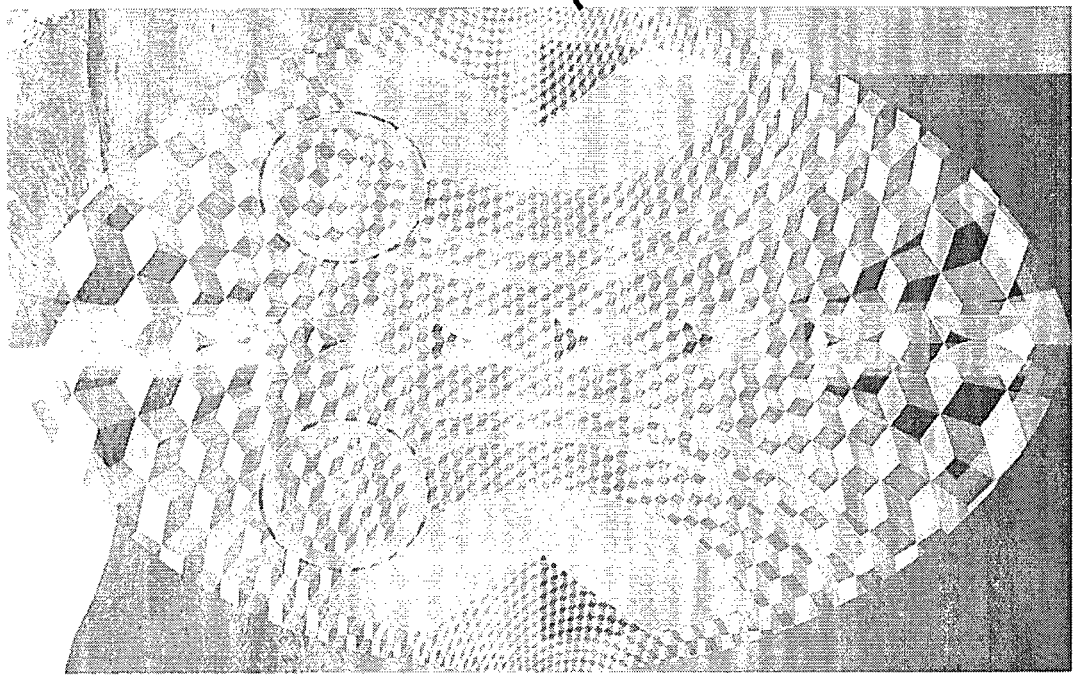
FIG. 12 shows a shield incorporating a stylized staircase rendered with a metallic ink where the staircase becomes apparent at a specular viewing angle.
Figure 12:
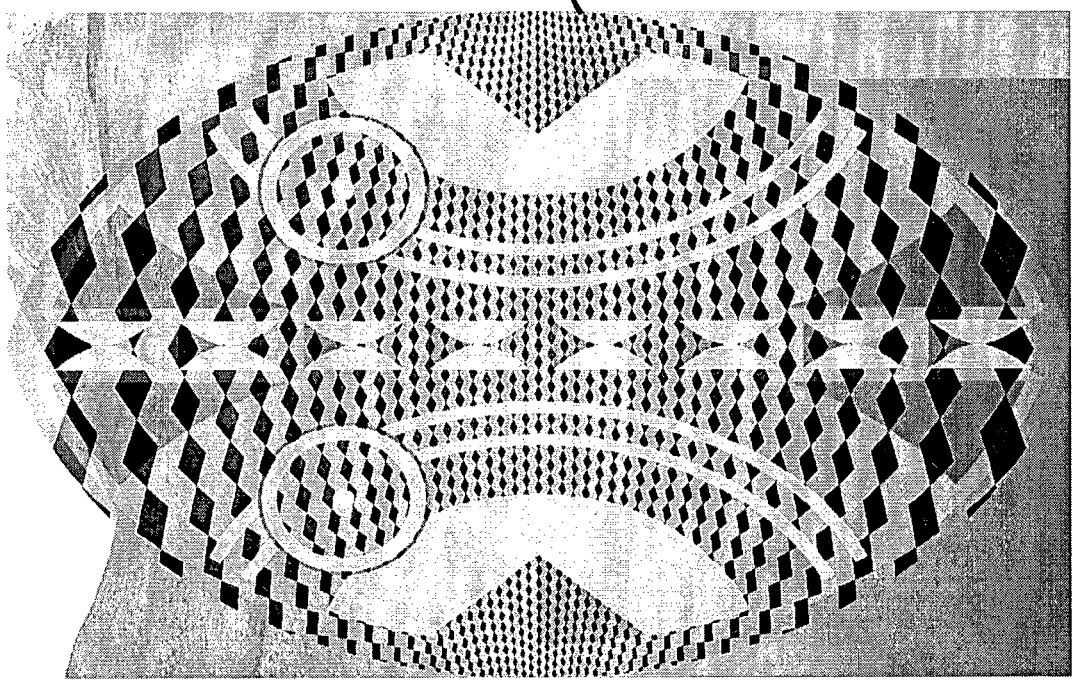

A further exploitation of the inversion effect is shown in the example of FIG. 12. This example shows a warped staircase within a stylized shield. At non specular angles 1201, the depth effect is not easily perceived whereas at specular angles 1202, thanks to the visible depth effect, the staircase becomes immediately apparent. Dark brown surface motives 1203 have been placed at the top, bottom, left and right parts of the shield. They are very well visible at non-specular reflection angles. At specular reflection angles, the high reflectance of the metallic ink creates a strong contrast masking the dark brown surface motives and letting the staircase appear without discontinuity. Thanks to the high reflectance of the metallic ink at specular viewing angles, motives which are visible at non-specular reflection angles become partially or completely hidden at specular reflection angles.

Figure 13:
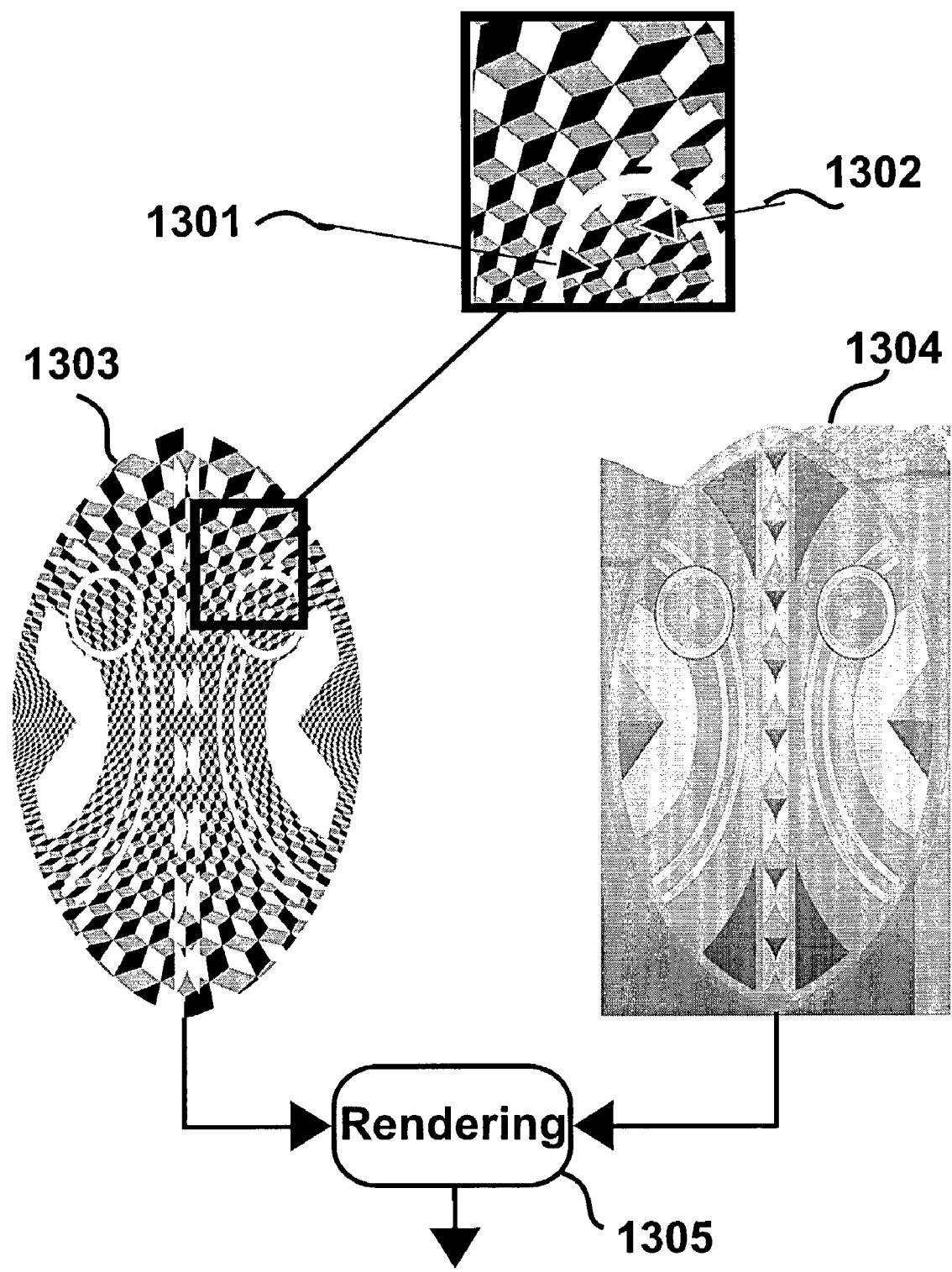
FIG. 13 gives a diagram explaining how to produce the image of FIG. 12.

FIG. 13 shows how the example in FIG. 12 was made. The mask image 1303 (pattern mask) specifies the locations to be printed with a metallic ink (silver). Each staircase comprises one face without metallic ink, one face 1301 where a nominal halftone coverage of metallic ink (e.g. 60%) was asked for, resulting in a predicted coverage of metallic ink so, and one face with an increased metallic ink halftone coverage, e.g. $s_0+30\%$. The combination (rendering 1305) of the color layers without metallic ink (parts of 1304 not covered by the mask) and of the color layers with the metallic ink leads to the final image combining colored image parts printed with a metallic ink and colored image parts printed without metallic ink.

The inversion effect described in the present invention is completely different from the inversion effect described in Patent application GB2375322, Security Device, inventors J. L. Thick, A. Nutton and R. Bratchley (also published as PTO WO0166360 and AU376320, priority date 10 Apr. 2000). In that invention, the inversion effect is produced by a specular reflecting background which is either dark or highlight. In the present invention, the inversion effect is produced by the specular reflecting combination of a metallic ink superposed with transparent inks, i.e. transparent non-reflective inks. In addition, in the present invention, the patterns and not the background are specular reflecting. Our background is the printed substrate, in the general case embodied by paper (diffusely reflecting) printed with transparent inks.

In the last category of design effects, we try to hide a ghost pattern at non-specular reflection angles and make it apparent at specular reflection angles. This is possible since the colors which are reproduced by transparent inks can, thanks to the matching procedure described in the previous section, also be reproduced at non-specular observation angles by the superposition of a metallic ink and transparent inks. Therefore, at non-specular reflection angles, the location of the ghost pattern is not easily detectable: its visibility is low. But, at specular reflection angles, the ghost pattern appears strongly and has a high visibility.

Completely hiding a pattern requires that the prediction models presented above work at a high accuracy: colors printed with a metallic ink should be less than $\Delta E=2$ apart from the corresponding colors printed with transparent inks.

Figure 14:
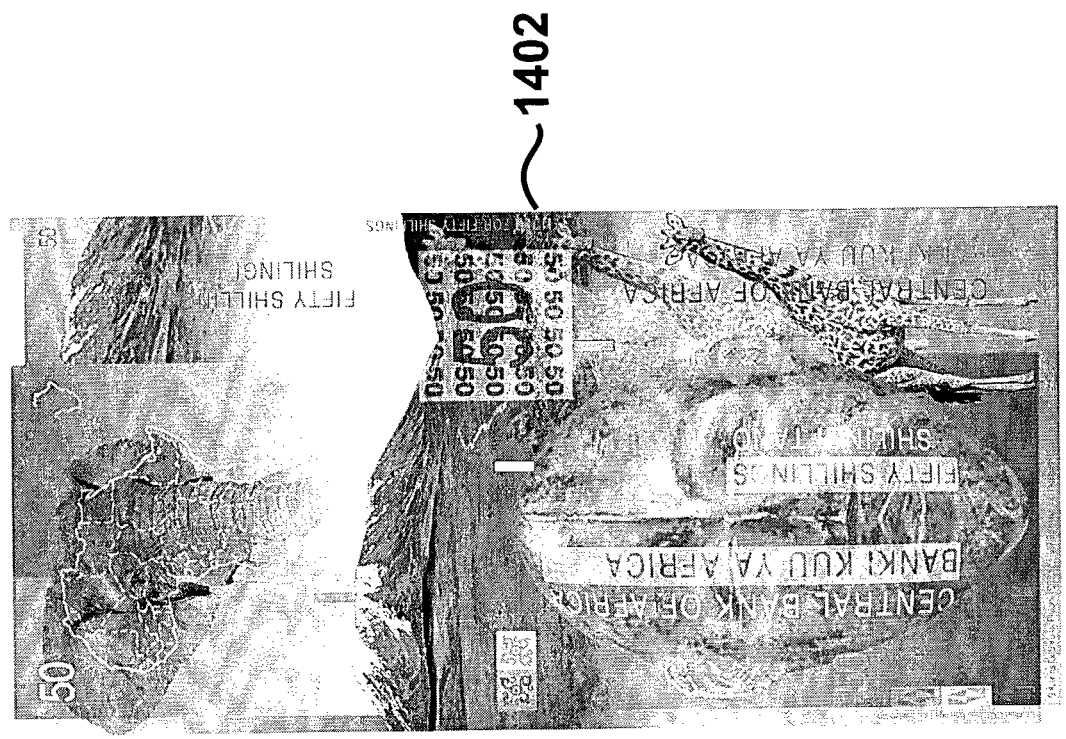
FIG. 14 shows how ghost patterns are hidden at a non-specular viewing angle and how they become apparent when seen from a specular viewing angle.
Figure 14:
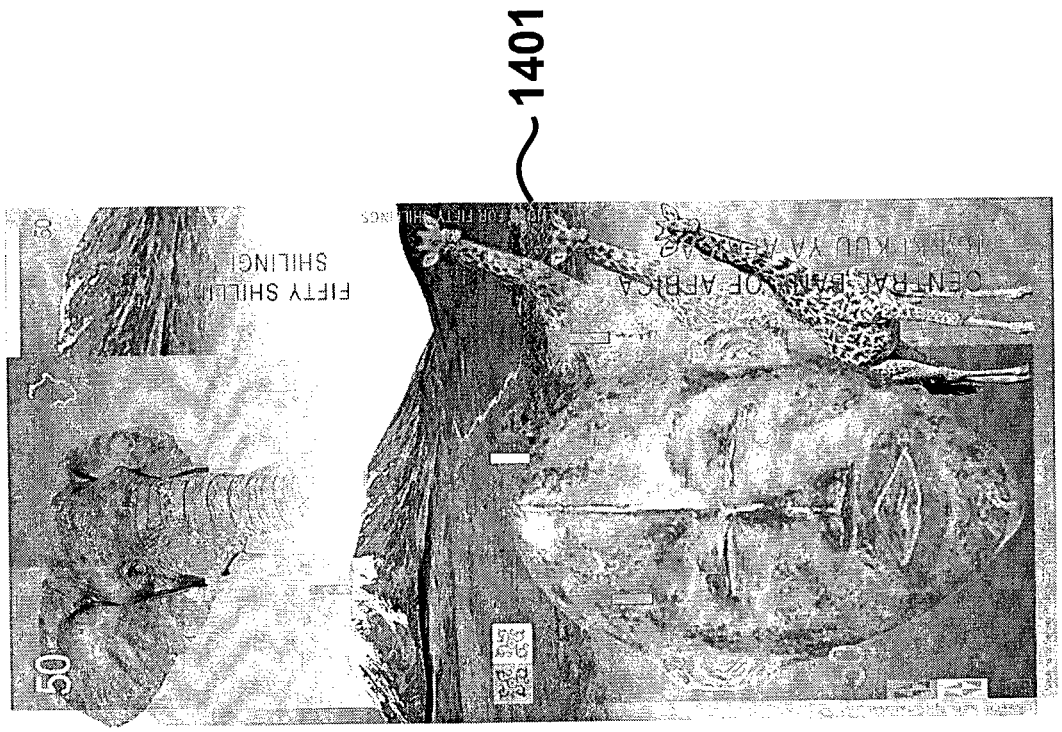
Figure 15:
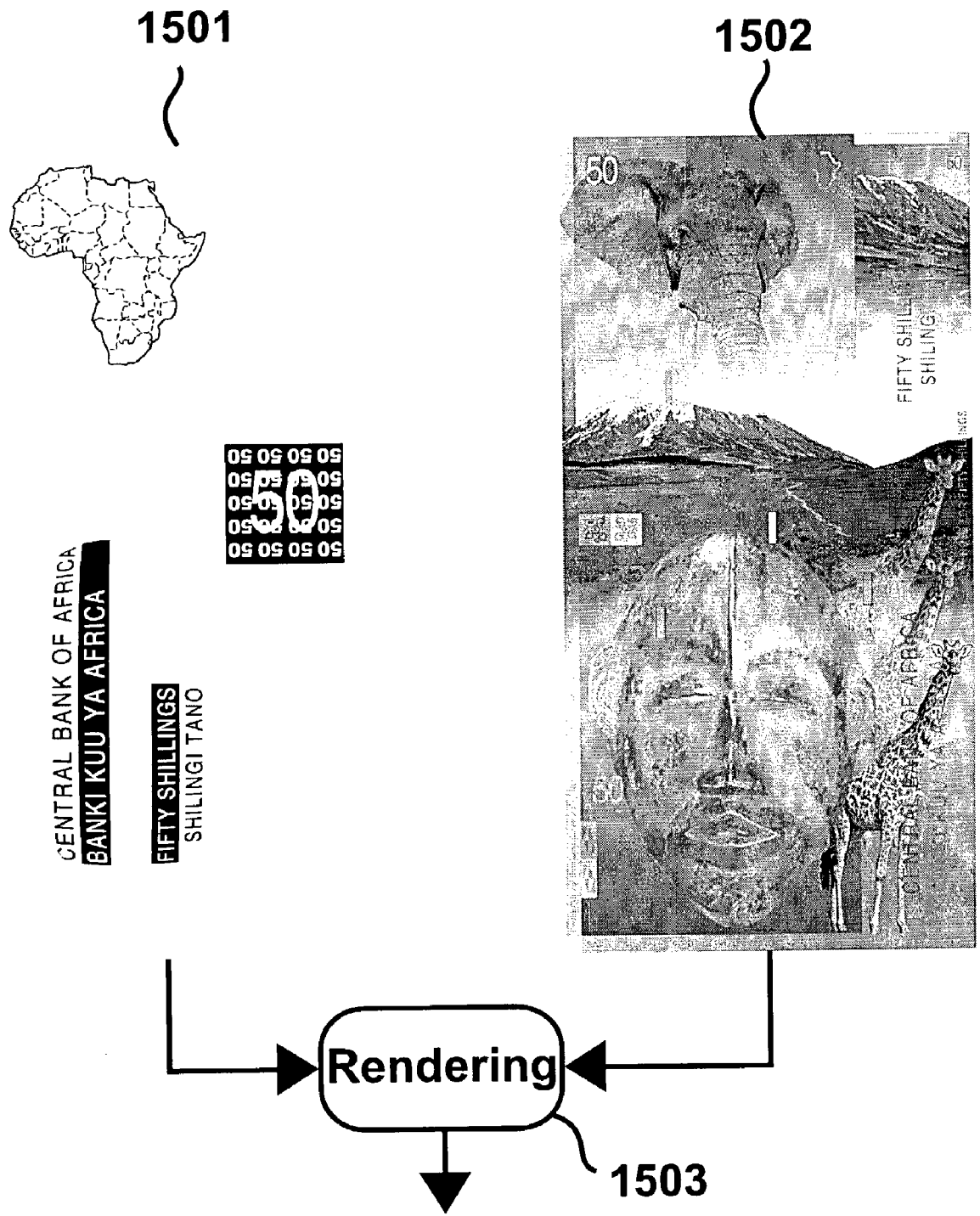
FIG. 15 gives a diagram explaining how to produce the image of FIG. 14.

FIG. 14 shows an image with ghost patterns hidden 1401 within the African mask, within the landscape (middle-right) and within the elephant. The ghost patterns become apparent under specular observation angles 1402 and allow to verify the authenticity of a security document. Since an accurate prediction model as well as accurate printing presses are necessary for hiding the metallic ink ghost pattern within a color image, metallic ghost patterns offer a significant anti-counterfeiting protection. FIG. 15 shows the pattern mask 1501 and the original image 1502 that were used to render

1503 the target image combining hidden patterns printed with a metallic ink and other image parts printed without metallic ink.

Steps for Calibrating the Model

In a preferred embodiment, assuming that one uses standard cyan, magenta and yellow inks for the reproduction of images incorporating a metallic ink, calibrating the model for printing with standard inks only comprises the following steps:
(1) separately printing solid cyan, magenta, yellow, red (superposition of magenta and yellow), green (superposition of cyan and yellow), blue (superposition of cyan and magenta) and black (superposition of cyan, magenta, yellow) solid patches, i.e. patches at 100% ink coverage;
(2) separately printing cyan, magenta and yellow wedges, for example at 10%, 20%, . . . ,90% and 100% ink coverages;
(3) printing combined ink wedges for taking into account ink spreading, e.g. a magenta wedge printed on top of solid cyan, a yellow wedge printed on top of solid magenta, a yellow wedge printed on top of solid cyan and a yellow wedge printed on top of cyan and magenta.
(4) computing the internal reflectance of paper $r_g$ thanks to equation 6 and the internal transmittances $t_w, t_c, t_m, t_y, t_r, t_b, t_k$ of the inks thanks to equation 7; and
(5) fitting according to formula (9) the coverages $f_c(c)$, $f_m(m), f_y(y)$ of the patches in the wedges printed in step (2) and the coverages $f_{m,c}(m), f_{y,c}(y), f_{y,m}(y), f_{y,c}, f_{y,cm}(y)$ of the patches in the wedges printed in step (3), where the coverage curves $f_c(c), f_m(m), f_y(y)$ and $f_{m,c}(m), f_{y,c}(y), f_{y,m}(y), f_{y,cm}(y)$ are made continuous by carrying out linear interpolation between fitted values.

In a preferred embodiment, calibrating the model for printing with a solid metallic ink and standard inks comprises the following steps:
(i) computing the transmittance $t_s$ of an equivalent ink layer for the metallic ink by measuring the reflectance of a solid metallic ink patch at a non-specular angle (i.e. according to a 45°/0° measuring geometry) and applying equation 7;
(ii) taking single ink trapping into account by fitting the trapped coverages of single inks $h_c(c), h_m(m), h_y(y)$ with the model of equation 9, where instead of individual colorant transmittances $t_j$, we use transmittances $t_{sj} = t_s t_j$; and, simultaneously, for the solid coverages, computing the corresponding metallic ink reflection spectra raising factors $f_{rc}, f_{rm}$, and $f_{ry}$;
(iii) fitting the trapped coverages of one ink printed together with a second solid ink, i.e. the trapping of magenta superposed with solid yellow $h_{c,y}(m)$, of yellow superposed with solid magenta $h_{y,m}(y)$, of cyan superposed with solid yellow $h_{c,y}(c)$, of yellow superposed with solid cyan $h_{y,c}(y)$, of cyan superposed with solid magenta $h_{c,m}(c)$ and of magenta superposed with solid cyan $h_{m,c}(m)$, and, simultaneously, for the solid coverages of two inks, computing the corresponding metallic ink reflection spectra raising factors $f_{rr}, f_{rg}$, and $f_{rb}$;
(iv) fitting the trapped coverages of one ink printed together with a second and third solid ink, i.e. three trapping coverage curves for respectively the cyan, magenta and yellow coverages in combination with the two other solid inks, i.e. $h_{c,my}(c), h_{m,cy}(m), h_{y,cm}(y)$; and
(v) fitting the effective coverages $s(s_{in})$ of the metallic ink according to equation (13), for the case of nominal coverages $s_{in}$ of 10%, 20%, 30%, . . . ,100% of the silver ink alone, printed over coated paper.

In the case that one uses custom transparent inks $c_1, c_2, c_3$, simply replace in the steps above cyan (c) by $c_1$, magenta (m) by $c_2$, and yellow (y) by $c_3$. The same logic applies when printing with four custom transparent inks $c_1, c_2, c_3, c_4$.

Steps for Building the 3D Lookup Table

Once the model for printing with transparent inks and for printing with a combination of a metallic ink and transparent inks has been established, building a 3D lookup table for replacing given coverages of cmy inks by coverages of $sc_s m_s y_s$ inks comprises the following steps:
(a) predicting the reflection spectra of patches printed with transparent inks associated to the selected cmy grid locations (e.g. all combinations of coverages of 0%, 12.5%, 25%, 37.5%, 50%, 62.5%, 75%, 87.5% and 100, i.e. 729 patches);
(b) by using the model for predicting the spectra of combinations of a metallic ink and standard inks, fitting for a selected desired coverage s of metallic ink corresponding amounts of standard inks $c_s m_s y_s$ and if no solution is found, reducing the desired amount of metallic ink in small steps, e.g. steps of 5% and again computing the corresponding amounts of standard inks $c_s m_s y_s$ until a solution is found.

In the case that one uses custom transparent inks $c_1, c_2, c_3$, build the 3D lookup table at selected $c_1, c_2, c_3$ grid locations. In the case of 4 custom inks, one may built a 4D lookup table in an analog manner.

Steps for Carrying Out the Color Separation With a Metallic Ink

In the general case, a pattern mask will specify the locations of the image to be printed with a metallic ink. When such a pattern mask is absent, we assume that all mask values are one and that the whole image is to be printed with a metallic ink. We assume that a conventional color separation step has already been carried out to transform an image from input color coordinates, e.g. red, green, blue to the ink coverages of the selected inks, in our example cyan, magenta and yellow inks (conventional color separation software is commercially available in software packages such as Adobe PhotoShop). This yields in the case of cyan, magenta and yellow inks a cmy image. To further obtain the color separation with a metallic ink, we carry out the following steps:
1. Traverse the cmy image pixel by pixel and row by row;
2. for each pixel (x,y), verify if the corresponding position is covered by the pattern mask, i.e. if mask (x,y)=1;
3. if pixel (x,y) is covered by the pattern mask, convert its cmy value into a $sc_s m_s y_s$ value by accessing and carrying out tri-linear interpolation within the 3D lookup table; if pixel (x,y) is outside the pattern mask, its output $c_s m_s y_s$ value is equal to its input cmy value and the coverage of the metallic ink s is, set to zero;

One may of course use other transparent inks instead of cyan, magenta, and yellow inks.

Variations in Respect to the Combinations of Metallic and Standard Inks

The color separation example disclosed above relies on the 3 standard inks cyan, magenta yellow and on silver as the metallic ink. In the simplest embodiment, the standard offset printing screen angles remain the same for cyan (e.g. 75°), magenta (e.g. 15°) and yellow (0°) and the metallic ink is placed instead of black at 45°. However, one may also use stochastic screens for the ink layers (see H. Kipphan, Handbook of Print Media, Springer-Verlag, 2001, p. 92).

Other variations of the inks are possible. For example, when using black ink (k) in addition to standard cyan, magenta and yellow, one may carry out the steps describe above and then apply one of the well-known under color removal techniques (H. Kipphan, Handbook of Print Media, Springer-Verlag, 2001, p. 87, p 501) to replace cmy inks by c'm'y'k inks. It may also be possible to replace $sc_s m_s y_s$ by $sc_s m_s y_s k_s$ inks for example by extending the prediction model for the superposition of a metallic ink and standard inks to an additional black ink.

One may also use as metallic ink an ink which differs from silver. In that case, the reflection spectrum will be color dependent, e.g. yellowish for gold. Such a reflection spectrum will induce also a "chromatic" equivalent ink layer transmittance spectrum. Nevertheless, the proposed model is applicable.

One may also want to have different amounts of a metallic ink within the same image. In that case, one may use instead of a binary pattern mask for specifying the location of the metallic ink a multi-level pattern mask specifying the desired amount of metallic ink, with zero specifying no ink and one specifying 100% metallic ink. Such an application then requires to build several 3D lookup tables, one for each desired amount of metallic ink (e.g. 20%, 40%, 60%, 80% and 100% metallic ink). When generating the color separation layers, it is then possible to interpolate between the effective metallic coverages stored in these 3D lookup tables in order to possibly obtain the desired coverages of standard and metallic inks (e.g. $sc_s m_s y_s$ values). Such a set of 3D lookup tables forms a 4D lookup table.

One may also choose to use several different colored metallic inks on the same picture. In that case an extended pattern mask will be used to specify which metallic ink is to be placed at a given location. For example, with metallic cyan ($c_m$), metallic magenta ($m_m$), gold ($y_m$) and silver (s) inks, the decision which metallic ink to use at a certain location may depend on the relative amounts of standard cyan (c), magenta (m), yellow (y) and black (k) inks at that location (the largest value of cmyk will determine if one should use respectively metallic ink $c_m$, $m_m$, $y_m$ or s). For this purpose, it is necessary to construct at least one 3D or possibly a 4D lookup table for each metallic ink. Sudden transitions between one metallic ink and the next one may be avoided by gradually lowering the amount of metallic inks at the boundary between regions printed with different metallic inks. Such a feature requires an extended pattern mask with for example two bits specifying which metallic ink is to be used and another 6 bits specifying the desired amount of that ink.

Figure 16:
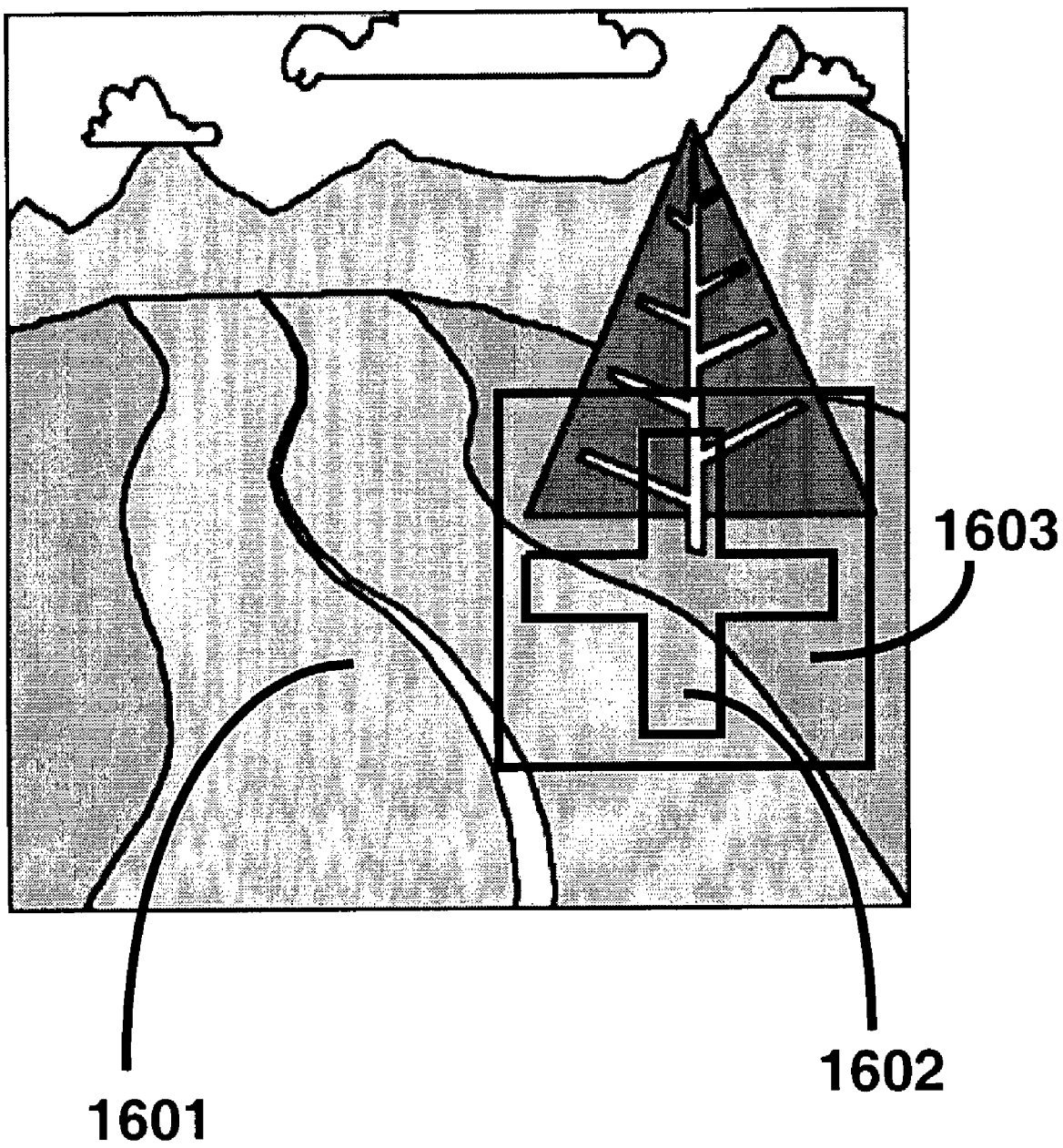
FIG. 16 gives an example of colored metallic pattern representing a known emblem or flag, hidden at non-specular reflection angles and becoming apparent when seen under a specular reflection angle.

The side by side placement of different colored metallic inks within the same picture allows the creation of an additional anti-counterfeiting feature. When seen from a non-specular observation angle, the patterns associated to the different metallic inks are partially or completely hidden within the image, i.e. the image looks smooth. However, at a specular observation angle, these colored metallic patterns become strongly visible. Due to their high contrast, they reduce the visibility of the other image parts. These colored metallic patterns may yield a well known pattern, for example the colors of the emblem of an organization. For example, a silver cross surrounded by a yellow metallic rectangle would be seen under specular reflection and perceived as the emblem of a given organization. As an example, FIG. 16 shows a landscape 1601, within which a yellow cross 1602 is printed with the superposition of a gold metallic ink and transparent inks and the cross background 1603 is printed with the superposition of a silver ink and transparent inks. At non-specular angles, both the yellow cross and its background cannot be easily distinguished from the remaining parts of the image 1601. However, at specular reflection angles, both the yellow cross and its background become visible as metallic colors, with a pronounced yellowish hue for the cross.

In a further variation, one may choose, instead of producing the metallic ink layer by printing with a metallic ink, to synthesize the metallic layer by another process such as the transfer of a metallic foil on a diffusely reflective substrate. Such a metallic foil possibly comprises tiny holes or other elements allowing a part (e.g. 25% to 50%) of the light to pass through in order to behave like a metallic ink layer. This metallic foil may be prepared in advance in order to only incorporate the desired metallic patterns at locations specified by a pattern mask. Alternately, once transferred onto the substrate, it can be further processed by mechanical, thermic or chemical means to yield the desired metallic patterns at locations specified by the pattern mask.

A further variation of the present invention would be, instead of producing the metallic ink layer by printing with a metallic ink, to produce the specular reflective (commonly called metallic) layer by laying out a specular reflective substrate on top of a diffusely reflective substrate. This specular reflective layer may comprise tiny holes or other elements allowing a small part of the light to pass through in order to behave like a metallic ink layer, i.e. to transmit a part (e.g. 25% to 50%) of the incident light to the underlying diffusely reflective substrate. The specular reflective layer may then be processed by mechanical, thermic or chemical means to allow light to pass through at locations situated outside the pattern mask and to reflect specularly light at locations within the pattern mask.

System for Performing the Color Separation of Images With at Least One Metallic Ink We disclose several variants of systems performing the color separation of images with at least one metallic ink. The first embodiment is described in detail. Further embodiments rely on a 3D lookup table and comprise modules from the first embodiment.

First Embodiment

A system (partly shown in FIG. 17) capable of performing the color separation of color images into a set of inks comprising at least one metallic ink comprises the following modules.

1. Calibration 1701: module for performing the calibration of the model capable of predicting the reflection spectra (and color) of transparent inks and of the superposition of a metallic ink and transparent inks. Calibration parameters are the internal transmittance of the inks, the internal transmittance of the substrate, the equivalent metallic ink layer transmittance, the physical dot gain and ink spreading curves for transparent inks, the trapping curves and the metallic ink reflection raising factors for superpositions of a metallic ink and transparent inks.

2. Standard color separation 1702: module for performing the color separation of a color image (e.g. red, green, blue (rgb) image 1706) onto a set of transparent inks, for example cyan, magenta and yellow 1703. Such a module is commercially available, for example within the software package Adobe PhotoShop.

3. Prediction for transparent inks 1704: module for predicting the reflection spectra 1710 (and color) of the superposition of transparent inks.
4. Prediction of the superposition of a metallic ink and transparent inks 1704: module for predicting the reflection spectra (and color) of the superposition of a metallic ink and transparent inks. If several metallic inks are used within the same image, we have one submodule for each metallic ink.
5. Module for fitting coverages of a metallic ink and transparent inks 1705 so as to match the reflection spectrum (or color) of a patch printed by transparent inks only. This module computes the coverages of the superposition of a metallic ink and transparent inks ($sc_s, m_s, y_s$) 1711.
6. An additional module may be used for deciding, depending on the values of a mask, if the current pixel of the color separated image is to be printed with transparent inks only 1703 or with a selected metallic ink 1711.

The system receives as input a color image 1706, for example given as red (r), green (g) and blue (b) display intensity values, as well as optional parameters 1707 specifying the desired set of output metallic ink(s) and the chosen set of transparent inks. For calibration purposes, it also receives as input 1708 spectral reflectance measurements of the substrate (paper), of the solid inks printed on the substrate (paper), of wedges of transparent inks printed alone and in superposition with solid transparent inks, of the metallic ink wedge (or wedges for several metallic inks), of superpositions solid metallic ink and transparent ink wedges, also with all combinations of solid transparent inks, as stated in section "Steps for calibrating the model". Optionally, the system may receive as input a mask specifying the locations to be printed with specific metallic inks. Alternately, the system may by itself decide which metallic ink is to be printed at which location. The system will then, with its different modules, compute the respective amounts of the selected metallic inks and the superposed transparent inks 1711 so as to reproduce the input image.

Second Embodiment

Figure 17:
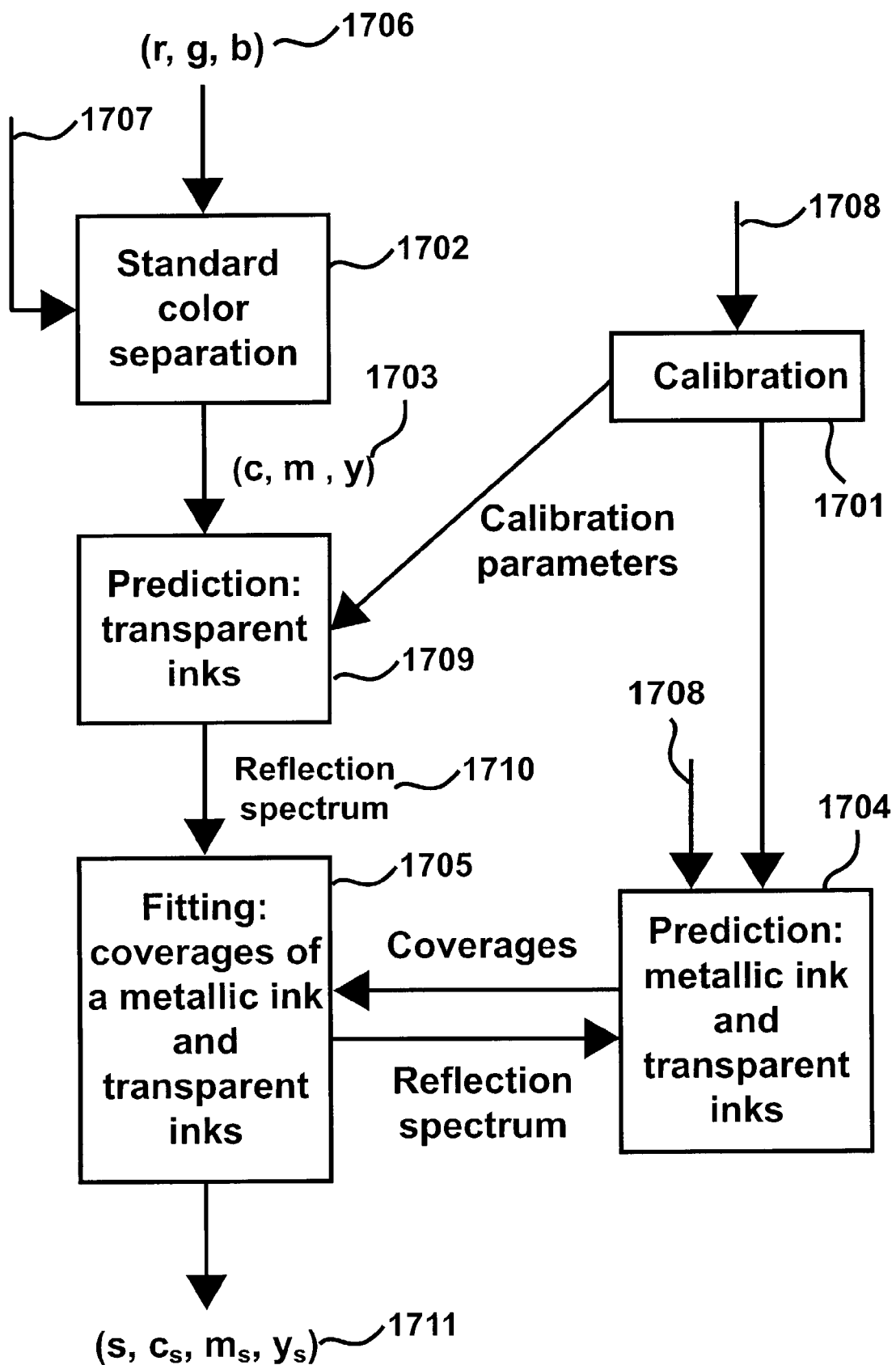
FIG. 17 is a diagram illustrating a system for performing the color separation of an input image into an image printed with a metallic ink and transparent inks.

For efficiency purposes, a lookup table based color separation system for printing with at least one metallic ink may comprise parts of the system described in FIG. 17 for filling the locations of a 3D lookup table responsible for creating a match between colors produced by transparent inks and colors produced by the superposition of a metallic ink and transparent inks. The modules of FIG. 17 used for filling the locations of the lookup table are the calibration module 1701, the module predicting the color the superposition of a metallic ink and transparent inks 1704, the module predicting the color of transparent inks 1709 and the module fitting coverages of a metallic ink and transparent inks 1705. These modules form the color matching subsystem shown in FIG. 18 (1804). This color matching sub-system 1804 is responsible for initializing the lookup tables of the lookup table based color matching module 1802.

Figure 18:
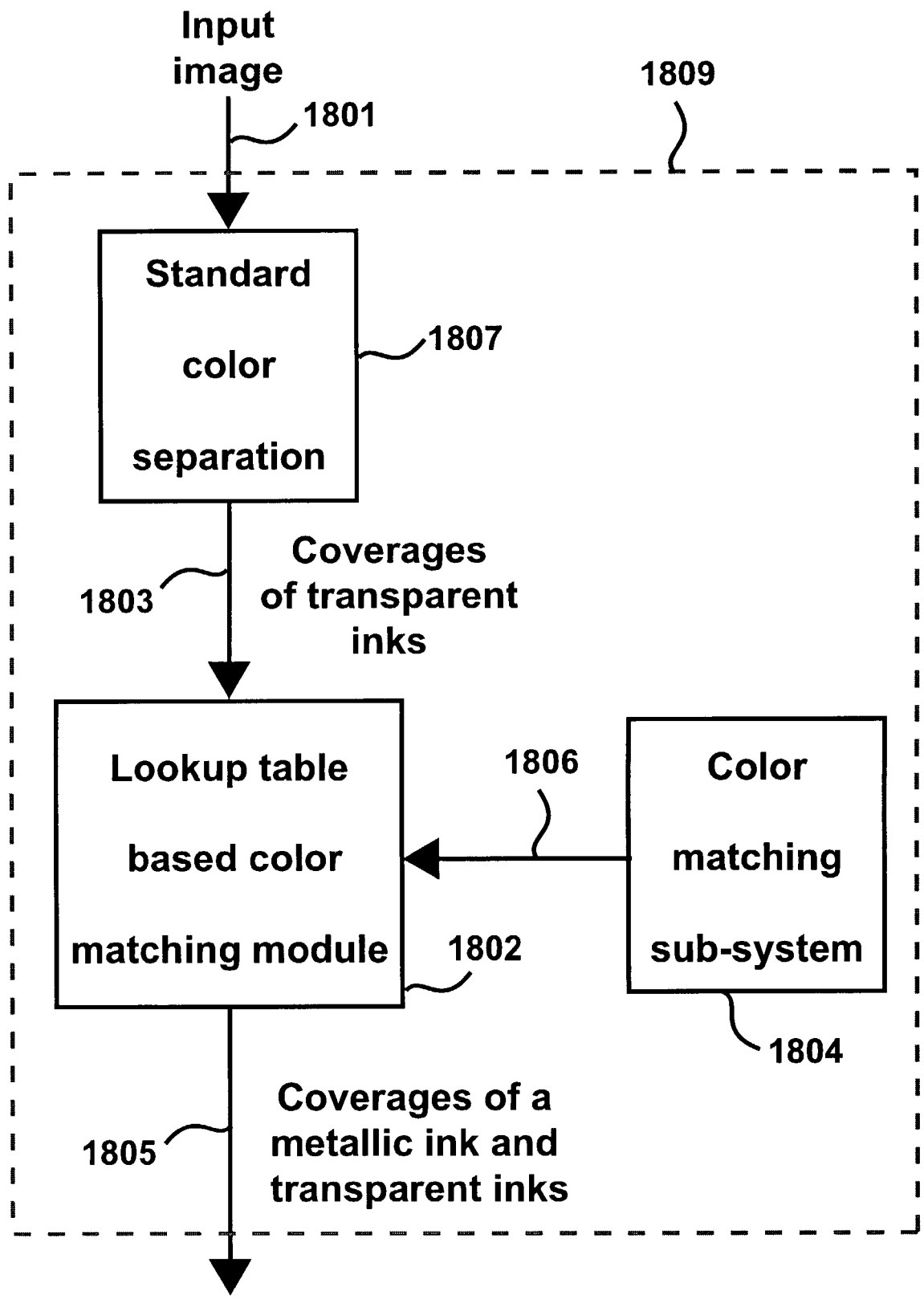
FIG. 18 is a diagram of a system for performing a lookup table based color separation of an input image into an image printed with a metallic ink and transparent inks.

The lookup table based color matching module 1802 then replaces by table lookup and interpolation coverages of transparent inks 1803 by coverages of a metallic ink and transparent inks 1805. The lookup table based color separation system 1809 is shown in FIG. 18. It converts an input color image 1801 into a color separated image printable with at least one metallic ink 1805. As first step, the input color image may be color separated 1807 into an image printable with transparent inks 1803. Coverages of these transparent inks may then, by accessing the lookup table based color matching module 1802, be converted into coverages of the superposition of a metallic ink and transparent inks 1805.

Third Embodiment

One may also think of a color separation system which, thanks to an extended lookup table, directly maps input image color coordinates to coverages of a metallic ink and transparent inks. Such an extended lookup table would include both the standard color separation into coverages of transparent inks and the replacement of transparent inks by superpositions of a metallic ink and transparent inks. In such an extended lookup table, the index into the table would be formed by input image color coordinates sampled at given intervals, e.g. 0%, 10%, . . . ,90%, 100%. In the case several metallic inks are used at different locations of the output image, several lookup tables may be used, one for each metallic ink. One may also use a mask specifying the locations which are to be printed without metallic ink and the locations which are to be printed with a metallic ink. This mask may also specify with which metallic ink a given part of the picture is to be printed.

Fourth Embodiment

In a further approach, consistent with printer calibration standards (see http:www.icc.org), the color separating system uses a lookup table, which converts device-independent color coordinates (e.g. CIE-XYZ) into coverages of a metallic ink and transparent inks. The values of the table are filled, as above, by a module predicting the color the superposition of a metallic ink and transparent inks. In such a lookup table, the index into the table would be formed by device-independent color coordinates sampled at given intervals, e.g. 0%, 10%, . . . ,90%, 100%. Color separation of an input image may then consist in converting input image color coordinates (e.g. red, green, blue) into device-independent color coordinates (e.g. CIE-XYZ), taking into account the printable gamut of the inks, as is known in the art and then applying table lookup and interpolation obtaining coverages of the superposition of a metallic ink and transparent inks. Such a color separating system comprises a conversion module which converts from input image coordinates to device-independent coordinates, and the look-up table described above containing the mapping from device-independent coordinates to coverages of the superposition of a metallic ink and transparent inks. It also comprises the module capable of predicting the color of the superposition of a metallic ink and transparent inks as well as the module fitting coverages of the superposition of a metallic ink and transparent inks so as to obtain a given device-independent color (specific CIE-XYZ value).

Further embodiments are also possible, for example by combining elements or modules from different embodiments.

Optimization of the Metallic Ink Effects

Figure 19:
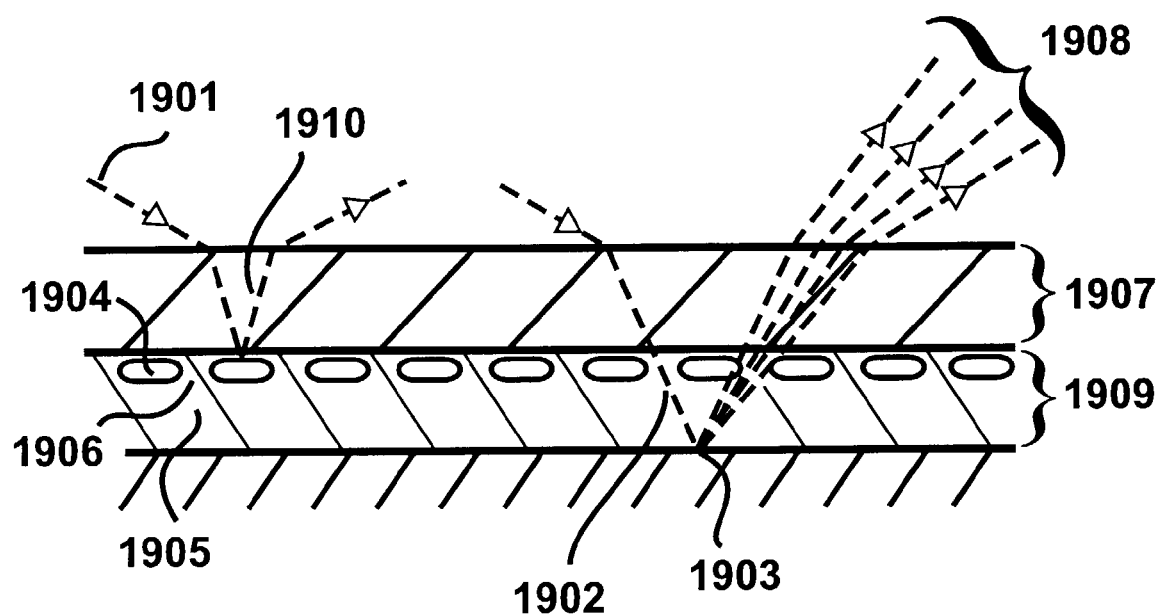
FIG. 19 shows a diagram of a metallic ink optimized for printing with the superposition of the metallic ink and transparent inks.

The effects induced by the superposition of a metallic ink and transparent inks may be optimized by using a metallic ink specially conceived for printing by superposing a metallic ink and transparent inks. The optimization aims at producing a metallic ink which (a) under specular reflection reflects an incident collimated light beam (FIG. 19, 1901) into the narrowest possible solid angle, i.e. the specular reflection lobe should be as narrow as possible and (b) lets a significant portion of the incident light pass through the metallic ink layer (FIG. 19, 1902) and be reflected (1903) by the underlying diffusely reflecting substrate. With a metallic ink layer whose equivalent transmittance is relatively high (between 0.25 to 0.6), metallic effects may also be attained in middle tones with a high metallic ink coverage. A metallic ink optimized for printing by superposing transparent inks should have a low leafing effect, i.e. the metallic particles 1904 swimming on top of the binder 1905 should be as flat as possible. By having as many metallic particles as possible oriented according to the same angle (preferably horizontally), incident light is specularly reflected 1910 along a specific solid angle. Furthermore, to allow light to pass through the binder, metallic particles should preferably be of a similar size and float on the surface of the binder. By providing enough space 1906 between the floating metallic particles, e.g. by limiting the concentration of the metallic particles, light traverses the metallic ink layer between the metallic particles 1902, is reflected 1903 by the underlying diffusely reflecting substrate (e.g. paper) traverses the metallic ink layer in the inverse direction, traverses the layer with the transparent inks 1907 and emerges diffusely 1908 from the printed patch surface. Variation in the amounts of transparent inks printed on top of the metallic ink yield variations of the colors that are visible under specular reflection. Furthermore, the binder 1905 within which the metallic particles are located may be made thick enough (e.g. 1/30 mm) to compensate for elevation variations of the underlying substrate, e.g. banknote paper. Alternately, to ensure a flat surface, the substrate (e.g. banknote paper) may be pressed and possibly heated. Finally, the metallic ink 1909 (metallic ink particles and binder) should be conceived so as to ensure a high adherence of the transparent inks to be printed on top of the metallic ink, i.e. avoid a to strong decrease in transparent ink surface coverage induced by metallic ink trapping. A good adherence of transparent inks on top of a metallic ink allows to enlarge the color gamut that can be reproduced by the superposition of the metallic ink and the transparent inks.

Figure 20:
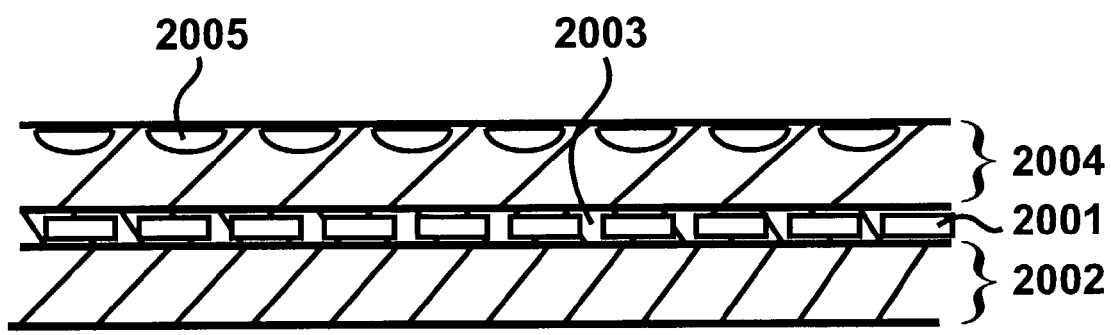
FIG. 20 shows a diagram illustrating a special substrate with a specular reflective layer located on top of diffusely reflecting layer.

According to the same requirements as for optimized metallic inks, a special substrate hereinafter called "specular-diffuse reflecting substrate" may be conceived, which comprises a specular reflective layer (FIG. 20, 2001) located on top of a diffusely reflected layer 2002. The specular reflective layer is flat and each location of it reflects an incident collimated light beam into a narrow solid angle. This specular reflective layer incorporates holes 2003 allowing light to pass through and be diffusely reflected by the underlying diffusely reflecting substrate 2002. Optionally, a transparent layer 2004, e.g. a varnish, is laid out on top of the specular reflecting layer in order to provide a good adherence to the transparent inks 2005 that are printed on top of the optimized substrate. By simple photolithography, or by simple exposure with a laser beam, the specular reflective layer is removed from specific locations of the substrate (locations specified by a mask) and allows to print with only the superposition of the diffuse reflective layer and transparent inks. The disclosed specular-diffuse reflecting substrate, when printed with transparent inks, allows to produce metallic colors at specular reflection angles which may be barely visible or hidden (invisible) at non-specular reflection angles. Such a specular-diffuse reflecting substrate may therefore replace the combination of metallic ink and paper. Such a specular-diffuse reflecting substrate may for example be placed on top of paper, on top of a plastic card or as a special sheet within a security document. The effects described in the present invention (microstructure enhancement, ghost patterns, patterns becoming visible at specular reflection angles, motives masked at specular reflection angles by visible microstructures, etc.) may also be achieved with such a specular-diffuse reflecting substrate.

Apparatus for Verifying the Authenticity of a Document

Figure 21:
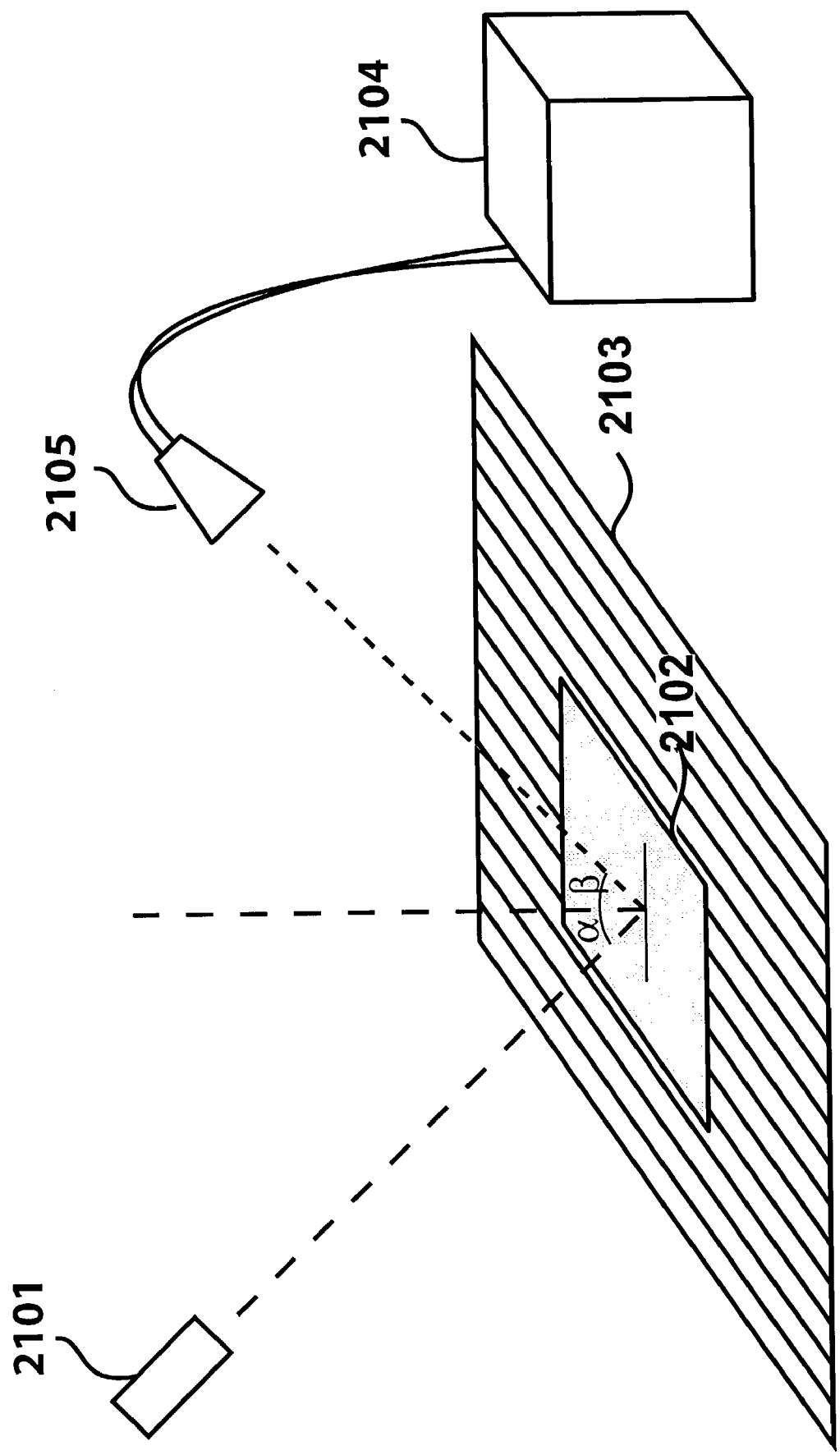
FIG. 21 shows an apparatus for verifying the authenticity of a document.

An apparatus (FIG. 21) operable for verifying the presence and obtaining the information item associated to a pattern embedded into a security document (or an image) printed by superposing a metallic ink and transparent inks comprises a light source 2101 and an image acquisition device 2105, for example a CCD camera, as well as computing means (a) for recognizing the presence of a specular reflecting pattern 2102 within the acquired image 2103 and (b) for identifying the pattern and associating to it an information item, such as a character string or a number. The apparatus may also comprise computing means 2104 for authenticating the security document. The light source and the image acquisition device need to be arranged so as to capture light specularly reflected by the metallic ink, for example the light source illuminating the printed sample at an angle a of 45° and the CCD camera capturing the reflected image at an angle situated around β=45' (from the normal to the printed image). The computing means 2104 may comprise a microprocessor system, such as the microprocessor system present in card readers. The apparatus first verifies the presence of such a pattern and then, according to state of the art pattern recognition techniques, tries to recognize the pattern and possibly decode it into an information item. Patterns may be formed by typographic characters, numbers, symbols, logos, bar-codes, etc . . . . In case of a bar code, the light source and image acquisition device may be embodied by a standard bar code reading equipment, for example placed vertically on top of the image and scanning the embedded bar code pattern. The information obtained by the recognizing and possibly decoding means may be overt, i.e. directly readable and understandable, or covert, i.e. encoded as non-intelligible information, usable only by a computer for authentication purposes. Computer based authentication of an information item may rely on an algorithm or on information stored internally in the computer or obtained by the computer from another computing device, e.g. a database incorporating the list of valid information items. Computer based authentication may also rely on matching the acquired information item to other information items present in the same document, e.g. printed on the document, located in a magnetic stripe pasted on the document, or stored electronically within a document's computing device (e.g. a smart card with a microprocessor). The disclosed apparatus may be integrated into a card reader (car reader for magnetic cards or for smart cards), yielding a card reader offering additional security.

Authentication of Security Documents Thanks to Individual Information Embedded as Metallic Patterns into Each Document Instance The information embedded as metallic patterns may vary for each instance of a security document (e.g. a banknote). The printing system synthesizing the security document's ink layers and printing them may be able to print in each document instance a different layout for the metallic ink layer(s) and the transparent ink layers. Such printers, also known as digital print on demand devices may dynamically vary the layout of each document, i.e in the present case, vary the layout of the mask specifying the regions to be printed with transparent inks only and regions to be printed with the superposition of a metallic ink and transparent inks.

The information embedded within the metallic patterns may therefore be individualized according to additional information related to the document, such as the document identification number, the name of the holder of the document, the temporal validity range of the document, etc. For example, the metallic patterns of a security document may represent the same number as the identification number of that security document or they may represent an encrypted number which, with the help of a decrypting key, can be matched with the identification number of that security document. The authentication means, an apparatus, a computing system or a human being, may acquire, either with a camera or visually, both the number embedded as a metallic pattern and the additional information located within the document instance, for example the document instance identification number. The authentication means may then either authenticate the security document or reject it as a counterfeit, depending if the document identification number and the number embedded as a metallic pattern match or not. If the information item embedded as a metallic pattern is overt, the match may be a simple comparison. If the information item embedded as a metallic pattern is covert, i.e. in encrypted form, matching may be performed according to an algorithm or by recovering the cryptic information with a key known by the authentication means. Alternately, the document identification number and the number embedded as a metallic pattern may be acquired and sent across a network to an authentication server, which may then either authenticate the security document or reject it as a counterfeit.

Possible Embodiments of Security Documents

The security documents may for example be embodied by banknotes, checks, diploma, corporate documents, passports, identity cards, credit cards, product labels, optical disks, CDs, DVDs, packages of medical drugs, cosmetics, wine bottles, and alcoholic drink bottles. In the case of banknotes, checks, diploma, corporate documents, passports, identity cards, credit cards, product labels, the image incorporating the superposition of at least one metallic ink and transparent inks is placed in some region of the security document. In the case of optical disks, CDs, or DVDs, the images incorporating the superposition of at least one metallic ink and transparent inks are placed printed on their packages (cover) or are directly printed on top of the device (optical disk, CD, DVD). In the case of valuable articles such as medical drugs, cosmetics, wine and alcoholic drink bottles, the images incorporating the superposition of at least one metallic ink and transparent inks are printed either on their package, on labels pasted onto the valuable articles or on labels attached to them.

Advantages

The present invention has a number of advantages over the prior art. The method we disclose provides the base for the replacement of transparent inks (e.g. standard cyan, magenta and yellow inks) by a combination of a metallic ink and transparent inks. Since the model takes into account the different phenomena present when printing with transparent inks and when printing with a combination of a metallic ink and transparent inks, it is very accurate. A patch printed with a set of transparent inks has substantially the same color at non-specular observation angles as the patch printed with corresponding computed coverages of the combination of a metallic ink and transparent inks.

The successive improvements disclosed in the present invention are the following:

(1) the enhancement of the Clapper-Yule model taking into account the fact that proportionally more incident light through a given colorant surface is reflected back onto the same colorant surface than onto other colorant surfaces;

(2) the separate modelling of physical (also called mechanical) dot gain by fitting the coverages of each ink according to the enhanced Clapper-Yule model;

(3) modelling of ink spreading, i.e. the dot coverage obtained when printing one ink over another ink.

(4) modelling the metallic ink at non-specular reflection angles by an equivalent internal ink layer with transmittance $t_s$;

(5) Modelling the trapping effect when printing with transparent inks on top of a metallic ink, i.e. surface coverage reduction specific for each ink and combination of inks;

(6) Modelling the raised ink reflection spectrum when printing at least one transparent ink on top of a metallic ink by metallic ink reflection spectra raising factors, specific for each ink and superposition of inks;

(7) Generalization of the Demichel equations (equation 2) in order to (a) combine physical dot gain and ink spreading (equation 10), (b) combine the different trapped coverages (equation 11)

(c) combine the different reflectance spectrum raising factors

In addition, the method offers a new, strong protection against counterfeiting attempts. Since standard color photocopiers generally copy images at non-specular reflection angles, the microstructure enhancement effect at specular reflection angles is lost in photocopied documents. Hidden motives remain completely or partially hidden in the photocopied document.

Furthermore, in contrast to previous methods where metallic patterns are superimposed onto images (e.g in the 10SFR Swiss banknote) or where the metallic surface simply forms the background on a security document (e.g. Patent application GB2375322, Security Device, inventors J. L. Thick, A. Nutton and R. Bratchley, also published as PTO WO0166360 and AU376320, priority date 10 Apr. 2000), the present invention offers a stronger anti-counterfeiting protection by embedding the metallic ink within a color image, i.e. an image incorporating many different colors and intensities. To counterfeit a document, potential counterfeiters would need the software being able to carry out this embedding process.

A further advantage in comparison to prior art techniques making use of a metallic ink (e.g.

Patent application GB2375322, Security Device, inventors J. L. Thick, A. Nutton and R. Bratchley (also published as PTO WO0166360 and AU376320, priority date 10 Apr. 2000) is the possibility of hiding patterns in a printed image when viewed at non-specular angles and revealing these patterns when viewed at specular angles.

A further advantage in respect to the prior art is the ability to carry out the color separation of images for printing by superposing transparent inks and a metallic ink, said color separation being very precise compared with the prior art approach relying on undercolour removal (U.S. Pat. No. 5,370,976).

A further advantage in respect to the prior art relies on the fact that at specular reflection angles, the light reflected by the superposition of a metallic ink and transparent inks is partly colored, i.e. its spectrum depends on the transmission spectra of the transparent inks superposed on top of the metallic ink. This allows to produce images which when seen under specular reflection may have important hue variations. This is an important improvement over iridescent or pearlescent inks, which at a certain angle, only reflect a specific color. It is also an improvement over varnish laid out on top of a color image, which at specular reflection, reflects only the color of the incoming light beam.

A further advantage in respect to the prior art is the possibility of printing color images with multiple colored metallic inks, further enhancing the specular nature of the printed image, which cannot be replicated with standard color photocopiers.

A further advantage in respect to the prior art is the possibility of conceiving a metallic ink specially optimized for printing by superposing a metallic ink and transparent inks, the optimized metallic ink allowing to have a strong light reflection at specular angles, to be able to reproduce midtones with a high metallic ink coverage and to offer, by ensuring a high adherence of the transparent colors, a large color gamut at specular reflection angles.

A further advantage in respect to the prior art is the possibility of conceiving a specular-diffuse reflecting substrate specially allowing to print on it with transparent inks and to produce similar effects as the effects obtained when printing by superposing a metallic ink and transparent inks.

A further advantage of the present invention resides in the fact that in contrast to watermarks (e.g. U.S. Pat. No. 6,208, 735, Secure spread spectrum watermarking for multimedia data, Cox et al. issued Mar. 27, 2001 or U.S. patent application Ser. No. 09/923,762, Digitally watermaking holograms for use with smart cards, inventors Lofgren et. al.) the patterns present in the image are directly readable and verifiable by a human operator as well as by an apparatus operable for acquiring, recognizing and associating to the pattern an overt or covert information item.

A further advantage of the present invention resides in the fact that with digital print on demand printers, the metallic ink patterns may be individualized for each instance of a security document. They may contain information relative to the specific instance of the security document, such a number associated to the security document identification number, the name of the document holder or possibly the date and time of the event, for which the security document was issued. The information embedded within the metallic ink patterns may be over, i.e. directly readable by a human operator or covert, i.e. recoverable by using a key or an algorithm.

Printing documents and images according to the present invention is also much less expensive than adding to security documents optically variable devices such as Kinegrams (U.S. Pat. No. 5,032,003), Pixelgrams or Holograms (standard or with an embedded watermark, see U.S. patent application Ser. No. 09/923,762, Digitally watermaking holograms for use with smart cards, inventors Lofgren et. al.) onto documents. Firstly, metallic ink printing may be embedded into an offset or serigraphic printing process and does not require an additional document production step. Secondly, there is no need to produce a master in order to create an image embedding patterns printed by superposing a metallic ink and transparent inks.

Successive Accuracy Improvements

The following table gives an example of the successive accuracy improvements brought by the different model components. Differences between predicted and measured spectra are given in terms of CIE-LAB ΔE values (see H. R. Kang, Color Technology for Electronic Imaging Devices, SPIE Optical Engineering Press, 1997, 8-12).

| | Number of samples | Max ΔE | Mean ΔE | # samples ΔE > 4 |
|---|---|---|---|---|
| Clapper-Yule with dot-gain only | 729 | 12.09 | 5.37 | 577 |
| Clapper-Yule, dot-gain and ink spreading | 729 | 8.82 | 3.21 | 208 |
| Enhanced Clapper-Yule with dot-gain only | 729 | 7.09 | 2.94 | 118 |
| Enhanced Clapper-Yule with dot-gain and ink spreading | 729 | 7.09 | 2.36 | 64 |
| Metallic Clapper-Yule with trapping effect | 625 | 7.49 | 3.11 | 145 |
| Metallic Clapper-Yule with trapping effect and with raised reflection spectrum | 625 | 6.66 | 2.37 | 60 |

REFERENCES CITED

US Patents and Patent Applications

U.S. Pat. No. 5,370,976 "Metallic Color Printing Process", inventors J. S. Williamson, G. V. Barnaby, G. V. Doughty, filed May 22, 1992, issued Dec. 6, 1994, U.S. Pat. No. 6,198,545, Method and apparatus for generating halftone images by evolutionary screen dot contours, inventors Ostromoukhov, Hersch, priority date Mar. 30, 1994, filed Mar. 27, 1995, issued Mar. 6, 2001, Assignee Ecole Polytechnique Fédérale Lausanne (EPFL), Switzerland, U.S. Pat. No. 6,208,735, Secure spread spectrum watermarking for multimedia data, I. Cox, J. J. Kilian, G. Talal, inventors, filed Jan. 28, 1999, issued Mar. 27, 2001, U.S. Pat. No. 5,032,003 Optially variable surface pattern, Inventor G. Antes, July 16, filed Nov. 28, 1989, issued Jul. 16, 1991

U.S. patent application Ser. No. 09/923,762, Digitally watermaking holograms for use with smart cards, inventors N. Lofgren, S. K. Decker, H. L. Brunk, J. S. Carr, filed Aug. 6, 2001, published Jun. 27, 2002

Foreign Patent Document

Patent application GB2375322, Security Device, inventors J. L. Thick, A. Nutton and R. Bratchley (also published as PTO WO0166360 and AU376320, priority date 10 April 2000)

Other References

F. R. Clapper and J. A. C. Yule, The Effect of Multiple Internal Reflections on the Densities of Half-tone Prints on Paper, Journal of the Optical Society of America, Volume 43, Number 7, July 1953, pp. 600-603

S. Inoue, N. Tsumara, Y. Miyake, Measuring MTF of Paper by Sinusoidal Test Pattern Projection, Journal of Imaging Science and Technology, Vol. 41, No. 6, November/December 1997, 657-661

D. B. Judd, Fresnel reflection of diffusely incident light, Journal of Research of the National Bureau of Standards, Vol. 29, November 42, 329-332

H. R. Kang, Applications of color mixing models to electronic printing, Journal of Electronic Imaging, Vol. 3, No. 3, July 1994, 276-287

H. R. Kang, "Color Technology for Electronic Imaging Devices", SPIE Optical Engineering Press, 1997, pp. 8-12

H. R. Kang, "Color Technology for Electronic Imaging Devices", SPIE Optical Engineering Press, 1997, pp. 43-45, original reference is: J. A. C. Yule, W. J. Nielsen, The penetration of light into paper and its effect on halftone reproductions, Proc. TAGA, Vol. 3, 1951, 65-76, Kern G. M., Micale J., Lavelle S., Valenzuela P., "Hiding power of aluminium pigments in printed ink films", American Ink Maker, vol 69, no 10, October 91, 60-68

H. Kipphan, Handbook of Print Media, Springer-Verlag, 2001, pp. 103-105

H. Kipphan, Handbook of Print Media, Springer-Verlag, 2001, p. 92

H. Kipphan, Handbook of Print Media, Springer-Verlag, 2001, p. 87, p 501

P. Kubelka, "New contributions to the optics of intensely light-scattering material, part II: Non-homogeneous layers", Journal of the Optical Society of America, Vol. 44, 1954, 330-335

H. E. J. Neugebauer, Die theoretischen Grundlagen des Mehrfarbendrucks, Zeitschrift fuer wissenschaftliche Photographie, Vol. 36, 1937, 36-73, reprinted in Neugebauer Seminar on Color Reproduction, SPIE Vol-1184, 1989, 194-202

V. Ostromoukhov, R. D. Hersch, "Artistic Screening", Siggraph95, Computer Graphics Proceedings, Annual Conference Series, 1995, pp. 219-228

W. H. Press, B. P. Flannery, S. A. Teukolsky, W. T. Fetterling, Numerical Recipes, Cambridge University Press, 1st edition, 1988, section 10.5, pp. 309-317

G. Rogers, "A Generalized Clapper-Yule Model of Halftone Reflectance", Journal of Color Research and Application, Vol. 25, No. 6, December 2000, 402-407

J. L. Saunderson, "Calculation of the color pigmented plastics, Journal of the Optical Society of America", Vol. 32, 1942, 727-736

A. Stanton, G. Raencic, Ink Trapping and Colorimetric Variation, Proc. TAGA 2001, 258-281

E. J. Stollnitz, V. Ostromoukhov, D. Salesin, "Reproducing Color Images Using Custom Inks", Proc. of SIGGRAPH 98, in Computer Graphics Proceedings, Annual Conference Series, 1998, 267-274

D. R. Wyble, R. S. Berns, A Critical Review of Spectral Models Applied to Binary Color Printing, Journal of Color Research and Application, Vol. 25, No. 1, February 2000, 4-19

We claim:

1. A method for performing a fully computerized and accurate color separation of an input color image into a color separated output image printable on a substrate with at least one metallic ink comprising the step of fitting surface coverages of the metallic ink and of transparent inks according to a model predicting the color of superpositions of the metallic ink and the transparent inks, said model relying on the transparent inks' internal transmittances and on the substrate's reflectance, where said color separated output image is printed on an item selected from the set of security documents and valuable products and where said color separated output image comprises superpositions of the metallic ink and the transparent inks at specularly reflecting locations and superpositions of transparent inks without metallic ink at other locations, and where the specularly reflecting locations of the superpositions of the metallic ink and the transparent inks are hidden at non-specular reflection angles and become visible at specular reflection angles.

2. The method of claim 1, where the specularly reflecting locations are formed by motives selected from the set of text, typographic characters, graphical elements, logos and ornaments.

3. The method of claim 1, where said item is embodied by a device selected from the set of banknotes, checks, diploma, corporate documents, passports, identity cards, credit cards, product labels, optical disks, CDs, DVDs, packages of medical drugs, cosmetics, wine bottles, and alcoholic drink bottles.

4. A method for performing a fully computerized and accurate color separation of an input color image into a color separated output image printable on a substrate with at least one metallic ink comprising the step of fitting surface coverages of the metallic ink and of transparent inks according to a model predicting the color of superpositions of the metallic ink and the transparent inks, said model relying on the transparent ink's internal transmittances and on the substrate's reflectance, where said color separated output image is printed on an item selected from the set of security documents and valuable products, where said color separated output image is formed by both microstructure and motive elements, where said microstructure elements are rendered by specularly reflecting superpositions of the metallic ink and the transparent inks and where said motive elements are visible at non-specular angles and masked at specular angles by specular reflections of said microstructure elements.

* * * * *